United States Patent
Jang et al.

(10) Patent No.: US 12,502,150 B2
(45) Date of Patent: Dec. 23, 2025

(54) SYSTEM FOR AND METHOD OF DEEP LEARNING DIAGNOSIS OF PLAQUE EROSION THROUGH OPTICAL COHERENCE TOMOGRAPHY

(71) Applicants: The General Hospital Corporation, Boston, MA (US); Korea Advanced Institute of Science and Technology, Daejeon (KR)

(72) Inventors: Ik-Kyung Jang, Weston, MA (US); Jong Chul Ye, Daejeon (KR); Sangjoon Park, Daejeon (KR)

(73) Assignees: The General Hospital Corporation, Boston, MA (US); Korea Advanced Institute of Science and Technology, Daejeon (KR)

( * ) Notice: Subject to any disclaimer, the term of this patent is extended or adjusted under 35 U.S.C. 154(b) by 350 days.

(21) Appl. No.: 18/043,853

(22) PCT Filed: Aug. 30, 2021

(86) PCT No.: PCT/US2021/048175
§ 371 (c)(1),
(2) Date: Mar. 2, 2023

(87) PCT Pub. No.: WO2022/051211
PCT Pub. Date: Mar. 10, 2022

(65) Prior Publication Data
US 2023/0255581 A1  Aug. 17, 2023

Related U.S. Application Data

(60) Provisional application No. 63/073,870, filed on Sep. 2, 2020.

(51) Int. Cl.
*A61B 6/50*  (2024.01)
*A61B 6/03*  (2006.01)
(Continued)

(52) U.S. Cl.
CPC .............. *A61B 6/504* (2013.01); *A61B 6/032* (2013.01); *G06N 3/0499* (2023.01); *G06N 3/084* (2013.01);
(Continued)

(58) Field of Classification Search
CPC ...... A61B 6/504; A61B 6/032; G06N 3/0499; G06N 3/084; G06N 3/045; G06N 3/088;
(Continued)

(56) References Cited

U.S. PATENT DOCUMENTS

| | | |
|---|---|---|
| 8,077,939 B2 | 12/2011 | Le Nezet et al. |
| 8,150,496 B2 | 4/2012 | Tearney et al. |

(Continued)

FOREIGN PATENT DOCUMENTS

| | | |
|---|---|---|
| EP | 3624056 A1 | 3/2020 |
| WO | 2005058153 A2 | 6/2005 |
| WO | 2019183584 A1 | 9/2019 |

OTHER PUBLICATIONS

Xia Hua, Xinqing Wang, Ting Rui, Haitao Zhang, and Dong Wang: "A fast self-attention cascaded network for object detection in large scene remote sensing images"; Jul. 1, 2020; Applied Soft Computing Journal 94 (202) 106495; pp. 1-20. (Year: 2020).*

(Continued)

*Primary Examiner* — Siamak Harandi
(74) *Attorney, Agent, or Firm* — QUARLES & BRADY LLP

(57) ABSTRACT

A method for identifying plaque erosion in a vessel. The method includes: obtaining, using a processor, a sequence of images of the vessel; extracting, using the processor, one or more image features from the sequence of images using a convolutional neural network model; contextually classifying, using the processor, the one or more extracted image features using a cascaded self-attention trained model; and (Continued)

generating, using the processor, one or more diagnostic labels associated with the sequence of images based on contextually classifying the one or more extracted image features, where the one or more diagnostic labels may include an indication of a presence of plaque erosion or an absence of plaque erosion.

19 Claims, 23 Drawing Sheets

(51) Int. Cl.
| | |
|---|---|
| G06N 3/045 | (2023.01) |
| G06N 3/0499 | (2023.01) |
| G06N 3/084 | (2023.01) |
| G06T 7/00 | (2017.01) |
| G16H 20/10 | (2018.01) |

(52) U.S. Cl.
CPC ........... *G06T 7/0012* (2013.01); *G16H 20/10* (2018.01); *G06T 2207/10081* (2013.01); *G06T 2207/10088* (2013.01); *G06T 2207/10101* (2013.01); *G06T 2207/20084* (2013.01)

(58) Field of Classification Search
CPC ......... G06T 7/0012; G06T 2207/10081; G06T 2207/10088; G06T 2207/10101; G06T 2207/20084; G16H 20/10; G06V 10/82; G06V 2201/03
See application file for complete search history.

(56) References Cited

U.S. PATENT DOCUMENTS

| | | | |
|---|---|---|---|
| 9,805,463 | B2 | 10/2017 | Choi et al. |
| 10,303,923 | B1 * | 5/2019 | Parise .................. G06V 10/454 |
| 10,478,130 | B2 | 11/2019 | Sharma et al. |
| 10,671,918 | B2 | 6/2020 | Gao et al. |
| 10,699,163 | B1 | 6/2020 | Shah et al. |
| 10,776,654 | B2 | 9/2020 | Madden et al. |
| 2015/0016702 | A1 | 1/2015 | Huizenga et al. |
| 2018/0336319 | A1 | 11/2018 | Itu et al. |
| 2019/0294758 | A1 | 9/2019 | Prozuments et al. |
| 2020/0034436 | A1 | 1/2020 | Chen et al. |
| 2020/0065969 | A1 | 2/2020 | Huang et al. |
| 2020/0104681 | A1 | 4/2020 | Li et al. |
| 2020/0279656 | A1 | 9/2020 | Koo et al. |
| 2021/0007807 | A1 | 1/2021 | Sankaran et al. |
| 2021/0085397 | A1 | 3/2021 | Passerini et al. |
| 2021/0186448 | A1 | 6/2021 | Min |
| 2023/0274420 | A1 * | 8/2023 | Seah ....................... G06F 40/30 382/128 |

OTHER PUBLICATIONS

Abdolmanafi et al., Deep Feature Learning for Automatic Tissue Classification of Coronary Artery Using Optical Coherence Tomography, Biomedical Optics Express, 2017, 8(2):1203-1220.

Abdolmanafi et al., Fully Automatic Artificial Intelligence Diagnostic Model of Coronary Artery Lesions Using OCT Imaging, Canadian Journal of Cardiology, 2019, 35:S61-S62.

Abdolmanafi et al., A Deep Learning-Based Model for Characterization of Atherosclerotic Plaque in Coronary Arteries Using Optical Coherence Tomography Images, Medical Physics, 2021, 48(7):3511-3524.

Amsterdam et al., 2014 AHA/ACC Guideline for the Management of Patients with Non-ST-Elevation Acute Coronary Syndromes: A Report of the American College of Cardiology/American Heart Association Task Force on Practice Guidelines, Journal of the American College of Cardiology, 2014, 64(24):e139-e228.

Arbustini et al., Plaque Erosion is a Major Substrate for Coronary Thrombosis in Acute Myocardial Infarction, Heart, 1999, 82(3):269-272.

Athanasiou et al., A Deep Learning Approach to Classify Atherosclerosis Using Intracoronary Optical Coherence Tomography, In Medical Imaging 2019: Computer-Aided Diagnosis, 2019, vol. 10950, 8 pages.

Bar et al., Chest Pathology Detection Using Deep Learning with Non-Medical Training, In 2015 IEEE 12th International Symposium on Biomedical Imaging (ISBI), pp. 294-297.

Bien et al., Deep-Learning-Assisted Diagnosis for Knee Magnetic Resonance Imaging: Development and Retrospective Validation of MRNet, PLoS Medicine, 2018, 15(11): e1002699, 19 pages.

Carion et al., End-to-End Object Detection with Transformers, In European Conference on Computer Vision, 2020, pp. 213-229.

Chen et al., A Simple Framework for Contrastive Learning of Visual Representations, In International Conference on Machine Learning, PMLR, 2020, pp. 1597-1607.

Dai et al., In Vivo Predictors of Plaque Erosion in Patients with ST-Segment Elevation Myocardial Infarction: A Clinical, Angiographical, and Intravascular Optical Coherence Tomography Study, European Heart Journal, 2018, 39 (22):2077-2085.

De Fauw et al., Clinically Applicable Deep Learning for Diagnosis and Referral in Retinal Disease, Nature Medicine, 2018, 24(9):1342-1350.

Dempster, A Generalization of Bayesian Inference, Journal of the Royal Statistical Society: Series B (Methodological), 1968, 30(2):205-231.

Deng et al., Artificial Intelligence to Identify Acute Coronary Syndroms: Detection of Vulnerable Coronary Plaques in OCT Images With Deep Learning, Circulation, 2018, 138(Suppl 1):A16139.

Devlin et al., BERT: Pre-Training of Deep Bidirectional Transformers for Language Understanding, arXiv:1810.04805, 2019, 16 pages.

Gangl et al., P5627 Automated Detection of Calcified Plaques in Coronary Optical Coherence Tomography Images Using Image Segmentation Based on Machine Learning, European Heart Journal, 2019, 40(Supplement 1):3499.

Gessert et al., Automatic Plaque Detection in IVOCT Pullbacks Using Convolutional Neural Networks, IEEE Transactions on Medical Imaging, 2018, pp. 1-9.

Gharaibeh et al., Coronary Calcification Segmentation in Intravascular OCT Images Using Deep Learning: Application to Calcification Scoring, Journal of Medical Imaging, 2019, 6(4):045002, 11 pages.

Guo et al., A Machine Learning-Based Method for Intracoronary Oct Segmentation and Vulnerable Coronary Plaque Cap Thickness Quantification, International Journal of Computational Methods, 2018, 15(1):1842008, 12 pages.

Hannun et al., Cardiologist-Level Arrhythmia Detection and Classification in Ambulatory Electrocardiograms Using a Deep Neural Network, Nature Medicine, 2019, 25(1):65-69.

He et al., Deep Residual Learning for Image Recognition, In Proceedings of the IEEE Conference on Computer Vision and Pattern Recognition, 2016, pp. 770-778.

He et al., Convolutional Neural Network Based Automatic Plaque Characterization for Intracoronary Optical Coherence Tomography Images, In Medical Imaging 2018: Image Processing, 2018, vol. 10574, pp. 800-806.

Higuma et al., A Combined Optical Coherence Tomography and Intravascular Ultrasound Study on Plaque Rupture, Plaque Erosion, and Calcified Nodule in Patients with ST-Segment Elevation Myocardial Infarction: Incidence, Morphologic Characteristics, and Outcomes after Percutaneous Coronary Intervention, JACC: Cardiovascular Interventions, 2015, 8(9):1166-1176.

Jia et al., In vivo Diagnosis of Plaque Erosion and Calcified Nodule in Patients with Acute Coronary Syndrome by Intravascular Optical Coherence Tomography, Journal of the American College of Cardiology, 2013, 62(19):1748-1758.

Jia et al., Effective Anti-Thrombotic Therapy Without Stenting: Intravascular Optical Coherence Tomography-Based Management in Plaque Erosion (The EROSION Study), European Heart Journal, 2017, 38:792-800.

(56) References Cited

OTHER PUBLICATIONS

Kolluru et al., Deep Neural Networks for A-line-based Plaque Classification in Coronary Intravascular Optical Coherence Tomography Images, Journal of Medical Imaging, 2018, 5(4):044504, 9 pages.

Lee et al., Automated Plaque Characterization Using Deep Learning on Coronary Intravascular Optical Coherence Tomographic Images, Biomedical Optics Express, 2019, 10(12):6497-6515.

Li et al., H-DenseUNet: Hybrid Densely Connected UNet for Liver and Tumor Segmentation from CT Volumes, IEEE Transactions on Medical Imaging, 2018, 37(12):2663-2674.

Liu et al., A Comparison of Deep Learning Performance Against Health-Care Professionals in Detecting Diseases from Medical Imaging: A Systematic Review and Meta-Analysis, The Lancet Digital Health, 2019, 1(6):e271-e297.

Loshchilov et al., Decoupled Weight Decay Regularization, arXiv:1711.05101, 2017, 19 pages.

Min et al., Detection of Optical Coherence Tomography-Defined Thin-Cap Fibroatheroma in the Coronary Artery Using Deep Learning, EuroIntervention, 2020, 16(5):404-412.

O'Gara et al., 2013 ACCF/AHA Guideline for the Management of ST-Elevation Myocardial Infarction: A Report of the American College of Cardiology Foundation/American Heart Association Task Force on Practice Guidelines, Journal of the American College of Cardiology, 2013, 61(4):e78-e140.

Partida et al., Plaque Erosion: A New In Vivo Diagnosis and a Potential Major Shift in the Management of Patients with Acute Coronary Syndromes, European Heart Journal, 2018, 39(22):2070-2076.

Prati et al., OCT-Based Diagnosis and Management of STEMI Associated with Intact Fibrous Cap, JACC: Cardiovascular Imaging, 2013, 6(3):283-287.

Rajkomar et al., Machine Learning in Medicine, New England Journal of Medicine, 2019, 380(14):1347-1358.

Saia et al., Eroded Versus Ruptured Plaques at the Culprit Site of STEMI: In Vivo Pathophysiological Features and Response to Primary PCI, JACC: Cardiovascular Imaging, 2015, 8(5):566-575.

Selvaraju et al., Grad-CAM: Visual Explanations from Deep Networks Via Gradient-Based Localization, In Proceedings of the IEEE International Conference on Computer Vision, 2017, pp. 618-626.

Smith et al., Super-Convergence: Very Fast Training of Neural Networks Using Large Learning Rates, arXiv:1708.07120, 2018, 18 pages.

Vaswani et al., Attention is all You Need, Advances in Neural Information Processing Systems, 2017, pp. 5998-6008.

Vedanthan et al., Global Perspective on Acute Coronary Syndrome: A Burden on the Young and Poor, Circulation Research, 2014, 114(12):1959-1975.

Voita et al., Analyzing Multi-Head Self-Attention: Specialized Heads Do the Heavy Lifting, the Rest can be Pruned, arXiv:1905.09418, 2019, 12 pages.

Xing et al., Erosion Study (Effective Anti-Thrombotic Therapy Without Stenting: Intravascular Optical Coherence Tomography-Based Management in Plaque Erosion) A 1-Year Follow-Up Report, Circulation: Cardiovascular Interventions, 2017, 10(12):e005860, pp. 1-8.

Yamamoto et al., Clinical and Laboratory Predictors for Plaque Erosion in Patients with Acute Coronary Syndromes, Journal of the American Heart Association, 2019, 8(21):e012322, 18 pages.

Zhang et al., Automatic Plaque Segmentation in Coronary Optical Coherence Tomography Images, International Journal of Pattern Recognition and Artificial Intelligence, 2019, 33(14):1954035, 23 pages.

PCT International Search Report and Written Opinion, PCT/US2021/048175, Nov. 30, 2021, 12 pages.

* cited by examiner

Performance comparison at frame-level for internal five-fold cross-validation

|  | AUC | Sensitivity | Specificity |
| --- | --- | --- | --- |
| ResNet-50 | 0.896 (0.896–0.897) | 0.789 (0.788–0.790) | 0.826 (0.825–0.826) |
| Novel DL model | 0.947 (0.946–0.947) | 0.815 (0.814–0.817) | 0.925 (0.925–0.925) |
| Performance Increase | +0.051 | +0.026 | +0.099 |

| | AUC | Sensitivity | Specificity |
|---|---|---|---|
| ResNet-50 | 0.852 (0.851-0.853) | 0.735 (0.733-0.736) | 0.794 (0.793-0.794) |
| Novel DL model | 0.962 (0.962-0.963) | 0.898 (0.896-0.899) | 0.911 (0.910-0.911) |
| Performance Increase | +0.110 | +0.163 | +0.117 |

Performance comparison at frame-level for external validation

Performance at patient-level for internal five-fold cross-validation

|  | AUC | Sensitivity | Specificity |
| --- | --- | --- | --- |
| Image Sequence Transformer | 0.898 (0.897–0.899) | 0.805 (0.803–0.807) | 0.857 (0.856–0.858) |

| | AUC | Sensitivity | Specificity |
|---|---|---|---|
| Image Sequence Transformer | 0.900 (0.899–0.901) | 0.898 (0.896–0.900) | 0.819 (0.818–0.821) |

Performance at patient-level for external validation

| True label \ Predicted | Plaque Erosion | Plaque Rupture | Other |
|---|---|---|---|
| Plaque Erosion | 3,133 | 133 | 242 |
| Plaque Rupture | 357 | 3,019 | 314 |
| Others | 2,584 | 5,137 | 50,495 |

FIG. 12A

| True label \ Predicted | Plaque Erosion | Plaque Rupture | Other |
|---|---|---|---|
| Plaque Erosion | 77 | 4 | 5 |
| Plaque Rupture | 37 | 166 | 3 |

FIG. 12B

SYSTEM FOR AND METHOD OF DEEP LEARNING DIAGNOSIS OF PLAQUE EROSION THROUGH OPTICAL COHERENCE TOMOGRAPHY

CROSS-REFERENCES TO RELATED APPLICATIONS

The present application represents the U.S. national stage entry of International Patent Application Ser. No. PCT/US2021/048175, filed Aug. 30, 2021, which is based on and claims priority from U.S. Patent Application Ser. No. 63/073,870, filed on Sep. 2, 2020, the entire disclosures of which are incorporated herein by reference.

BACKGROUND

Coronary plaque erosion is a major cause of acute heart attack and sudden death. Current diagnostic approaches that rely on detecting another common mechanism of heart attack, namely plaque rupture, exhibit large inter-individual variability and higher risk of misdiagnosis due to lack of objective criteria.

SUMMARY OF THE INVENTION

Thus, a need exists in the field for new diagnostic techniques with less variability and reduced risk of misdiagnosis. Accordingly, new systems, methods, and media for identification of plaque erosion through assistive software (software as a medical device) are provided, as are complementary commercial OCT consoles capable of assisting cardiologists in instantaneous and precise diagnosis and thereby tailored treatment methods.

In one embodiment, the disclosure provides a method for identifying plaque erosion in a vessel. The method includes: obtaining, using a processor, a sequence of images of the vessel; extracting, using the processor, one or more image features from the sequence of images using a convolutional neural network model; contextually classifying, using the processor, the one or more extracted image features using a cascaded self-attention trained model; and generating, using the processor, one or more diagnostic labels associated with the sequence of images based on contextually classifying the one or more extracted image features, where the one or more diagnostic labels may include an indication of a presence of plaque erosion or an absence of plaque erosion.

In some embodiments of the method, extracting one or more image features from the sequence of images using a convolutional neural network model may further include extracting the one or more image features from the sequence of images using the convolutional neural network model operating on each image in the sequence of images individually. In certain embodiments of the method, prior to extracting the one or more image features from the sequence of images, the method may include: training the convolutional neural network model based on a plurality of vessel images analyzed individually to generate a plurality of trained weights, transferring the trained weights to a cascaded self-attention model, and training, based on the trained weights, the cascaded self-attention model using a self-supervised contrastive learning procedure to generate the cascaded self-attention trained model.

In various embodiments of the method, training the cascaded self-attention model may further include training, based on the trained weights, the cascaded self-attention model based on analyzing sequences of the plurality of vessel images to generate the cascaded self-attention trained model. In some embodiments of the method, training the cascaded self-attention model may further include performing supervised learning on the cascaded self-attention trained model to optimize generating the one or more diagnostic labels.

In particular embodiments of the method, extracting one or more image features from the sequence of images using a convolutional neural network model may further include generating a saliency map of at least one image of the sequence of images to identify at least one of the one or more image features that is extracted by the convolutional neural network model. In certain embodiments of the method, the saliency map may be generated using gradient-weighted class activation mapping (Grad-CAM).

In some embodiments of the method, the one or more diagnostic labels may further include at least one of an indication of plaque rupture or an indication of an artifact from a medical device employed in acquiring the sequence of images. In various embodiments of the method, the cascaded self-attention trained model may include a transformer model. In particular embodiments of the method, the transformer model may include a self-attention encoder layer and a cascaded feed forward network layer. In certain embodiments of the method, the transformer model may further include another transformer layer with a prepended classification token.

In various embodiments of the method, the convolutional neural network model may include a ResNet-50 model. In some embodiments, the method may further include generating a probability of plaque erosion for the vessel for use in evaluating medical treatment options. In various embodiments of the method, the medical treatment options may include delivering a therapy to the patient based on the indication. In some embodiments of the method, the therapy may include an anti-thrombotic therapy. In particular embodiments of the method, the anti-thrombotic therapy may include a dose of ticagrelor and aspirin.

In particular embodiments of the method, the sequence of images may include images from at least one of optical coherence tomography (OCT), computed tomography (CT), and/or magnetic resonance imaging (MM). In certain embodiments of the method, the sequence of images of the vessel may include a sequence of cross-sectional images of the vessel.

In another embodiment, the disclosure provides a system for identifying plaque erosion in a vessel including a processor in communication with a memory, where the processor is configured to: obtain a sequence of images of the vessel, extract one or more image features from the sequence of images using a convolutional neural network model, contextually classify the one or more extracted image features using a cascaded self-attention trained model, and generate one or more diagnostic labels associated with the sequence of images based on contextually classifying the one or more extracted image features, where the one or more diagnostic labels may include an indication of a presence of plaque erosion or an absence of plaque erosion.

In some embodiments of the system, the processor, when extracting one or more image features from the sequence of images using a convolutional neural network model, may be further configured to extract the one or more image features from the sequence of images using the convolutional neural network model operating on each image in the sequence of images individually. In various embodiments of the system, the processor, prior to extracting the one or more image features from the sequence of images, may be configured to:

train the convolutional neural network model based on a plurality of vessel images analyzed individually to generate a plurality of trained weights, transfer the trained weights to a cascaded self-attention model, and train, based on the trained weights, the cascaded self-attention model using a self-supervised contrastive learning procedure to generate the cascaded self-attention trained model.

In certain embodiments of the system the processor, when training the cascaded self-attention model, may be further configured to train, based on the trained weights, the cascaded self-attention model based on analyzing sequences of the plurality of vessel images to generate the cascaded self-attention trained model.

In particular embodiments of the system the processor, when training the cascaded self-attention model, may be further configured to perform supervised learning on the cascaded self-attention trained model to optimize generating the one or more diagnostic labels. In various embodiments of the system, the processor, when extracting one or more image features from the sequence of images using a convolutional neural network model, may be further configured to generate a saliency map of at least one image of the sequence of images to identify at least one of the one or more image features that is extracted by the convolutional neural network model. In particular embodiments of the system, the saliency map may be generated using gradient-weighted class activation mapping (Grad-CAM).

In some embodiments of the system, the one or more diagnostic labels may further include at least one of an indication of plaque rupture or an indication of an artifact from a medical device employed in acquiring the sequence of images. In some embodiments of the system, the cascaded self-attention trained model may include a transformer model. In certain embodiments of the system, the transformer model may include a self-attention encoder layer and a cascaded feed forward network layer. In particular embodiments of the system, the transformer model may further include another transformer layer with a prepended classification token. In some embodiments of the system, the convolutional neural network model may include a ResNet-50 model.

In some embodiments of the system, the processor may be further configured to generate a probability of plaque erosion for the vessel for use in evaluating medical treatment options. In various embodiments of the system, the medical treatment options may include delivering a therapy to the patient based on the indication. In some embodiments of the system, the therapy may include an anti-thrombotic therapy. In particular embodiments of the system, the anti-thrombotic therapy may include a dose of ticagrelor and aspirin.

In various embodiments of the system, the sequence of images may include images from at least one of optical coherence tomography (OCT), computed tomography (CT), and/or magnetic resonance imaging (MM). In particular embodiments of the system, the sequence of images of the vessel may include a sequence of cross-sectional images of the vessel.

In some embodiments, the disclosure provides a treatment method, including: determining whether a plaque erosion is present in a patient via the computer-implemented steps of: receiving a sequence of images of a vessel of the patient; extracting image features from the sequence of images with a deep machine-learnt convolutional neural network model; generating an indication of coronary plaque erosion or absence of coronary plaque erosion associated with the sequence of images by contextually classifying the extracted image features with a cascaded self-attention trained model; and delivering a therapy to the patient based on the indication. In some embodiments of the treatment method, the therapy may include an anti-thrombotic therapy. In certain embodiments of the treatment method, the anti-thrombotic therapy may include a dose of ticagrelor and aspirin.

In other embodiments, the disclosure may provide a system including: a memory that stores computer executable components; and a processor that executes the computer executable components stored in the memory, wherein the computer executable components include: a first component that implements a deep machine-learnt neural network model for extracting image features from a sequence of images; and a second component that implements a self-attention trained model for generating one or more diagnostic labels associated with the sequence of images by contextually classifying the extracted image features; wherein the one or more diagnostic labels include an indication of plaque erosion or absence of plaque erosion. In some embodiments of the system, the one or more diagnostic labels may further include at least one of an indication of plaque rupture or an indication of an artifact from a medical device employed in acquiring the sequence of images. In various embodiments of the system, the self-attention trained model may further include a transformer model including a self-attention encoder layer and a cascaded feed forward network layer. In some embodiments, the system may further include a third component for generating a probability of plaque erosion for use in evaluating medical treatment options. In particular embodiments of the system, the sequence of images may include images obtained using at least one of optical coherence tomography (OCT), computed tomography (CT), and/or magnetic resonance imaging (MM).

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 12 shows confusion matrices for the Deep Learning (DL) model for frame-level and patient-level diagnosis, which contain the numbers of false-positive, false-negative, true-positive, and true-negative cases are presented for (Panel A) frame-level diagnosis and (Panel B) for patient-level diagnosis in the external testing data set.

DETAILED DESCRIPTION

Figure 1:
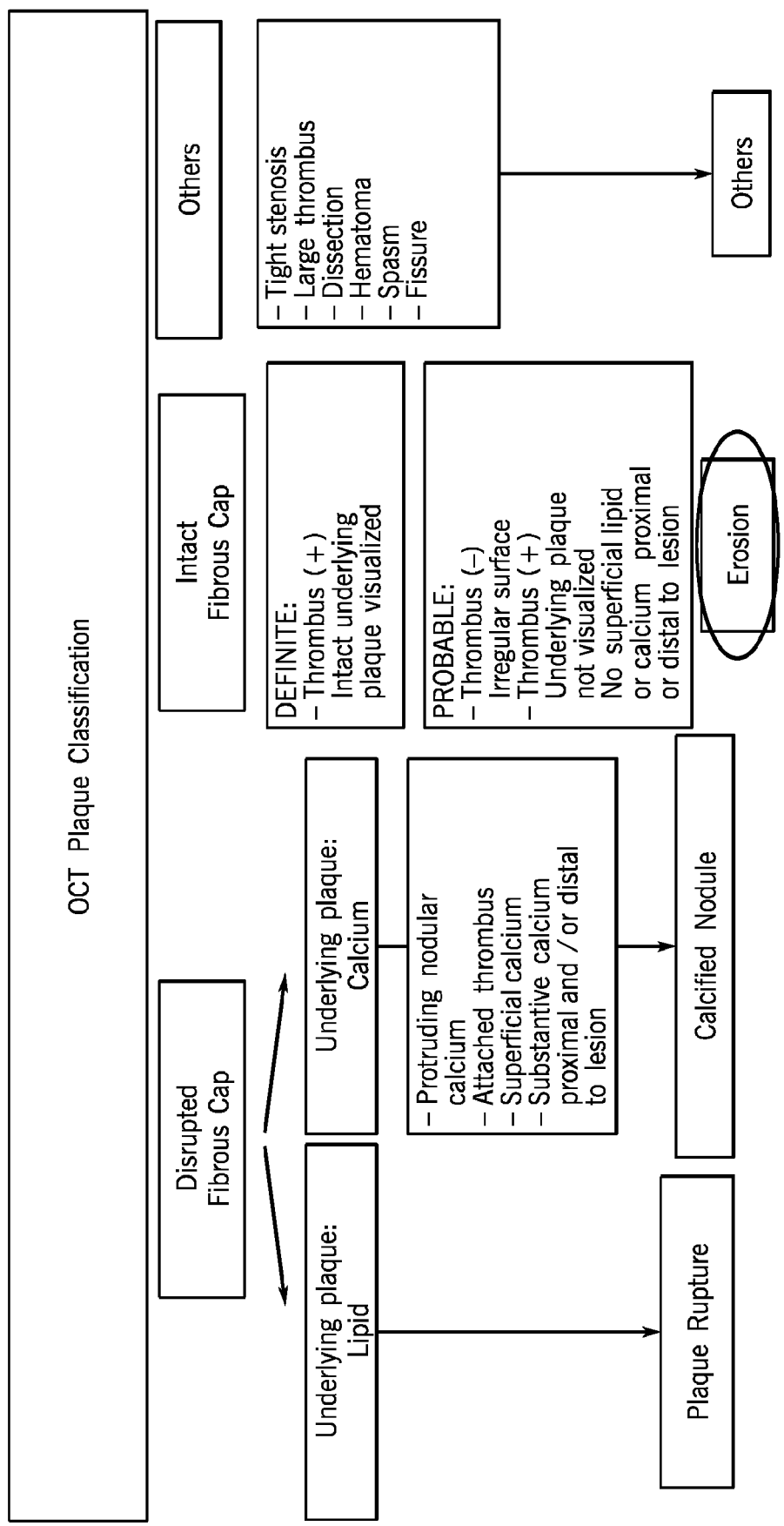
FIG. 1 shows a diagram of OCT plaque classification.

In accordance with some embodiments of the disclosed subject matter, mechanisms (which can include systems, methods, and media) for identifying plaque erosion in a vessel are provided.

It has been reported that plaque erosion is a distinct entity that can be diagnosed in living patients using intracoronary optical coherence tomography (OCT). Moreover, it has been shown that patients with acute heart attack caused by plaque erosion could be treated conservatively without a need for coronary stenting, for example receiving anti-thrombotic therapy which may include a dose of ticagrelor and/or aspirin. Such observations have laid the groundwork for a potentially major shift in the management of millions of people with heart attack around the world each year. The disclosed system further advances this field by facilitating diagnosis of plaque erosion, which may exclude plaque rupture.

In various embodiments, a diagnostic algorithm is disclosed which uses artificial intelligence (AI) procedures that may include a cascaded self-attention trained model such as a "transformer" model to contextually classify image features, which has not previously been reported in medical imaging. As documented herein, the results obtained using this approach have demonstrated significant improvements in diagnostic accuracy compared to standard approaches.

As noted above, the accurate identification of plaque erosion has the potential to dramatically change the current paradigm of treatment from coronary stent implantation in ACS (Acute Coronary Syndrome) patients irrespective of underlying mechanism to individualized therapy. Instances of plaque erosion may be treated conservatively without the need for coronary stenting, thereby avoiding potential stent-related acute and chronic complications such as stent thrombosis and in-stent restenosis (renarrowing). (See "Effective antithrombotic therapy without stenting: intravascular optical coherence tomography-based management in plaque erosion (the EROSION study)," *Eur. Hearts.* 2017 Mar. 14; 38(11):792-800, incorporated herein by reference in its entirety). Among various drawbacks, stent thrombosis can be catastrophic, with 70% incidence of heart attack and a very high mortality. Potentially, several million people may benefit from this precision medicine approach each year. Nevertheless, the diagnosis of plaque erosion using data obtained from a medical imaging system such as optical coherence tomography (OCT) requires expertise in image interpretation. Accordingly, a deep learning (DL) model has been developed to enable an accurate diagnosis of plaque erosion in a reliable manner that reduces reliance on expert image readers.

In various embodiments, the disclosed procedures may be incorporated into commercial OCT consoles or may be made available as a free-standing service (e.g. provided online) so that cardiologists will be able to make rapid diagnoses of plaque erosion with very high accuracy.

Prior to development of the procedures disclosed herein, vessel diagnosis using OCT images was viewed as a task of medical image classification. The existing algorithms for medical image classification mainly classify the sequential images (e.g. computed tomography, magnetic resonance, and OCT images) in a frame-by-frame manner, utilizing only the information from individual 2-dimensional (2-D) images. However, the consecutive context of the whole sequences, which clinical experts usually take into consideration during the diagnosis, may not be properly reflected by these approaches which are directed to single frames in isolation.

Embodiments of the disclosed procedures operate not only on a single frame of interest but on the whole context provided by a sequence of frames by utilizing transformer-type analysis tools. Self-attention trained models such as Transformers compute the importance of each element in an entire sequence through self-attention for an element in given position for sequential data. In particular, transformers have distinct advantages in that they can attend to distant as well as nearby elements without attenuation, as a result of the self-attention mechanism with simple matrix multiplication.

However, despite its use in other areas of AI, transformers are less often employed in computer vision due to difficulties with handling image data. Accordingly, a two-step approach has been taken to address these issues. First, in the pretraining stage, a convolutional neural network (CNN) with pre-trained weights with the ImageNet 2012 dataset was trained using individual 2D OCT images. In the subsequent training stage, the learned ResNet-50 weights from the first stage were transferred to a combined CNN-transformer architecture and the combined architecture was then jointly trained. The synergistic effect of these two components, namely the CNN architecture as feature extractor and the transformer as self-attention encoder, facilitated further improvement of the performance relative to conventional approaches based on analysis of single 2D images. The algorithm has improved the sensitivity for detecting plaque erosion from 62-74% (sensitivity using only conventional 2-D classification algorithms) to about 85%, which brings the results to an acceptable performance level for computer-aided diagnosis devices.

The AI architecture described and illustrated herein builds upon the OCT plaque classification framework shown in FIG. 1. Based on this framework, OCT training set images were identified with labels including "rupture", "erosion (=intact fibrous cap)" or "others" based on an initial set of features. Initially, only those cases with "plaque rupture" were considered and the disclosed AI system was used to diagnose plaque rupture (labeled "Non-E" for non-erosion). When satisfactory results were obtained with plaque rupture, the focus then shifted to erosion (labeled "PE" for plaque erosion). The label "catheter" as used herein refers to artifacts related to the medical device used to collect the data such as an OCT catheter.

Unlike certain other imaging tests used in the clinical setting where a diagnosis may be made based on the data in a single frame or image (for example, a single chest X-ray image), when diagnosing plaque erosion it can be helpful to review some or all of the OCT pull-back images (which may produce ~200 frames over a ~50 mm length of tissue) as a set, reviewing sequential images front to back multiple times. In the pull-back images, a first step is to identify a potential lesion. Subsequently, other categories of lesion such as plaque rupture, calcified plaques, artifact (e.g. due to the catheter), or other less frequent conditions may be ruled out by close review of the potential lesion in the context of adjoining images. The distinct nature of this approach has led to the present insight of applying a "transformer" neural network, as disclosed herein.

Accordingly, in various embodiments the present disclosure provides apparatus, methods, systems, and computer-readable media for identifying plaque erosion in a vessel of a subject, e.g. a patient. The apparatus, methods, systems, and computer-readable media may be or may be carried out using a computer system which includes a processor. As noted herein, embodiments of the presently-disclosed procedures provide improvements over known approaches (e.g. which may use CNN models or other approaches which operate on single images or frames rather than operating on a sequence of images.

The sequences of images may include medical imaging data which may be obtained from one or more of an interferometric system such as optical coherence tomography (OCT), magnetic resonance imaging (MRI), computed tomography (CT), or other systems. The sequence of images may include a series of cross-sectional images through a luminal sample such as a vessel (e.g. an artery such as a coronary artery). The system may analyze some or all of the images from a series of images.

The images may be analyzed using a multi-step (e.g. two-step) deep learning (DL) based AI analysis procedure which may include a feature extraction step followed by a self-attention encoding step. The feature extraction step may be based on analysis of single frames (which in some embodiments may be based on a CNN model) and the self-attention encoding step may be based on analysis of multiple sequential frames (which in some embodiments may be based on a transformer model). In various embodiments, sets of data which include erosion cases (e.g. 355 erosion cases in one particular embodiment) were used to train and test embodiments of the disclosed AI system for identifying plaque erosion in a vessel. The procedures may be incorporated into a system (e.g. an OCT system) or may be made available as a service (e.g. online, on a local computer, or through other means).

EXAMPLES

The following are non-limiting examples according to embodiments of the disclosed procedures.

Example 1

An embodiment of the DL model operates by emulating the attention given by cardiologists to consecutive OCT frames during pull-back. Performance of the model is compared with performance of the standard CNN model. We used 237021 cross-sectional OCT images from 581 patients from 8 institutions in 4 countries for training and internal validation, and 65394 images from 292 patients from another institution for external validation. DL models were developed to enable the diagnosis of plaque erosion both at the frame-level and the patient-level. Performance of the model was evaluated using metrics such as the area under the receiver operating characteristics (AUC).

For frame-level diagnosis of plaque erosion, embodiments of the disclosed DL model show better performance than the standard CNN model with an AUC of 0.946 (95% confidence interval [CI], 0.946-0.947) compared with 0.896 (95% CI, 0.896-0.896) in the internal validation and with AUC of 0.963 (95% CI, 0.962-0.963) compared with 0.852 (95% CI, 0.851-0.853) in the external validation. For the patient-level diagnosis, the disclosed DL model also showed improved diagnostic performance compared to the standard CNN model, with an AUC of 0.903 (95% CI, 0.902-0.903) compared with 0.881 (95% CI, 0.880-0.882) in the internal validation and with AUC of 0.905 (95% CI, 0.904-0.906) compared with 0.844 (95% CI, 0.842-0.845) in the external validation. Thus, the developed DL model enables accurate diagnosis of plaque erosion. This DL model will help cardiologists make an accurate diagnosis of plaque erosion in patients with ACS allowing considering tailored treatment according to the underlying pathology.

Acute coronary syndrome (ACS) is a common cause of morbidity and mortality worldwide. Although plaque rupture had been thought to be the underlying pathology of ACS, plaque erosion, which is another major underlying pathology for ACS, is responsible for 25-60% of ACS cases. Although a recent study reported that conservative therapy without coronary stenting might be an option in ACS patients with plaque erosion, patients with ACS are uniformly treated with intracoronary stenting, irrespective of the underlying pathology. Medical imaging procedures such as optical coherence tomography (OCT) have enabled the diagnosis of plaque erosion in living patients, but diagnosis of plaque erosion with OCT can be challenging due to subtle structural changes and therefore can require expertise in image interpretation. Accordingly, a diagnosis of plaque erosion in ACS patients is currently made by excluding plaque rupture at culprit lesion by OCT.

In addition, there may be considerable interobserver variability in the diagnosis of plaque erosion with OCT, as shown in the example of two recent MINOCA studies that reported the prevalence of plaque erosion as 3% in one study and 30% in the other study. Recently, artificial intelligence-based deep learning (DL) models have attained advances in performance using a variety of medical imaging modalities, including OCT images. However, the previous studies on the application of DL to OCT images are limited by the lack of availability of large and well-curated databases, and others have not tried to develop a model for end-to-end diagnosis of plaque erosion, which is challenging to detect.

Accordingly, disclosed herein are the development and internal validation of a DL model tailored for processing OCT image data to enable the accurate diagnosis of plaque erosion, using a large and well-curated multi-center dataset. In addition, we have externally validated the developed DL model in an independent external dataset to compare its performance with the standard CNN-based DL approach. In the external validation, the disclosed DL model showed excellent performance for the diagnosis of plaque erosion with the AUC of 0.963 and 0.905 at the frame-level and the patient-level, which was not possible with the standard CNN model with the AUC of 0.852 and 0.844 at the frame-level and the patient-level. It is noticeable that the disclosed DL model did not show any sign of performance decrease in the external validation compared with the results of internal validation, while the standard CNN model showed a significant decrease in performance in the external validation, which suggests superior generalization capability of the disclosed DL model.

Despite significant differences in characteristics of two major underlying pathologies for ACS, namely plaque erosion and plaque rupture, which can be managed differently, the lack of methods for accurate diagnosis of plaque erosion have forced physicians to uniformly treat all ACS patients with invasive stenting. The present results indicate the possibility of alleviating this problem by devising the DL model tailored for OCT image structure and by experimentally showing its superb performance over previous DL approaches. The DL model developed in this study can detect subtle structural changes of plaque erosion within medical images such as OCT images, and could potentially change the management of ACS patients worldwide according to the underlying pathology.

Deep learning (DL) has the potential to transform clinical care in medical imaging fields such as radiology and ophthalmology. Several studies have reported the application of deep learning on intravascular OCT images for tasks such as classification, segmentation of plaque, and other abnormalities. However, the clinical implication of these studies is limited by the small number of cases and suboptimal performance, which stem from the lack of large, well-curated databases and an algorithm suitable for processing sequential image data such as multiple frames of OCT images. Furthermore, studies on the classification of intravascular OCT images were devoted to low-level features such as tissue characterization and have never utilized end-to-end deep learning models for clinical diagnoses.

In this study, we sought to develop a DL model to improve the diagnostic accuracy of plaque erosion in patients with ACS using two large and well-curated databases. The disclosed DL model emulates the attention given by cardiologists to consecutive OCT frames during pull-back to improve the accuracy of the challenging task of diagnosing plaque erosion. This approach is then compared with a standard convolutional neural network (CNN)-based DL model for classification.

Study Design and Datasets

Patients presenting with ACS who had pre-intervention OCT imaging of the culprit lesion were selected for the training and validation data set from the Predictor study. The Predictor study was an international, multi-center, registry that included ACS patients who underwent OCT at 11 institutions in 6 countries and sought to identify clinical findings associated with the existence of plaque erosion. The data used for the current project was from 8 institutions in 4 countries (see below). To externally validate the developed model, patients from the EROSION study were used as a testing data set. The EROSION study was a single-center, prospective study that included ACS patients undergoing OCT and tested the safety of medical therapy instead of stent implantation. For the current project, patients with ACS caused by a supply-demand mismatch were excluded. Since the objective of this study was to diagnose plaque erosion, patients with ACS caused by uncommon pathologies such as calcified nodule, spontaneous coronary dissection, or coronary spasm were also excluded. The patient selection process is summarized below. The diagnosis of ACS, which included ST-segment elevation myocardial infarction (STEMI) and non-ST-segment elevation acute coronary syndromes (NSTE-ACS), was made according to the concurrent American Heart Association (AHA)/American College of Cardiology (ACC) guidelines. Demographic, clinical, and angiographic data were collected at each participating site and the anonymized data were sent to Massachusetts General Hospital (Boston, MA, USA). Details on definition of the training, internal and external validation datasets are provided below.

The Predictor study and the EROSION study were approved by the Institutional Review Boards at each participating site. For the Predictor registry, informed consent was waived. For the EROSION study, written informed consent was obtained prior to enrollment.

Image Acquisition and Data Labeling

The coronary segment that includes the ACS culprit lesion was assessed at 0.2-mm intervals using a frequency-domain (C7/C8, OCT Intravascular Imaging System, St. Jude Medical, St. Paul, Minnesota) OCT system and a 2.7-Fr OCT imaging catheter (Dragonfly, St. Jude Medical, St. Paul, Minnesota). OCT images were acquired before any percutaneous coronary intervention (PCI) procedures, with the exception of aspiration thrombectomy, which was allowed for occlusive thrombus. The median number of cross-sectional OCT images per patient was 217.

OCT images were analyzed at the core laboratory at Massachusetts General Hospital. Given that acquiring a definitive label through the collection of a histology sample is impractical for a large number of living patients, two experienced OCT readers (M. A. and A. N.) who were blinded to patients' data independently labeled all OCT images frame-by-frame using an offline review workstation (St. Jude Medical, St. Paul, Minnesota). When there was discordance between the investigators, a consensus reading was obtained. A diagnosis of plaque erosion was made based on previously established criteria. Labeling of cross-sectional OCT images in the training, validation, and external testing data sets was done frame-by-frame. Since the automated detection of plaque erosion in an OCT pullback is preferred, sections with normal vessel segment, non-culprit plaque, different types of artifact, and guiding catheter were also included. Since we aimed to develop a DL model for the accurate diagnosis of plaque erosion, OCT frames were classified into three entities: 1) "plaque erosion," an underlying pathology of ACS we want to diagnose, 2) "plaque rupture," another major underlying pathology of ACS which should be discriminated from plaque erosion, and 3) "others," referring to non-significant images (see below). Excellent intra-observer and interobserver agreement was noted in the classification of plaque erosion (kappa, 0.923 and 0.899, respectively).

Anonymized OCT images in DICOM (digital imaging and communications in medicine) format and their corresponding labels were transferred to the Bio Imaging, Signal Processing, and Learning laboratory (BISPL) at Korea Advanced Institute of Science and Technology (KAIST), South Korea for the development and validation of the deep learning model.

Development of the Deep Learning Algorithm

Figure 2A:
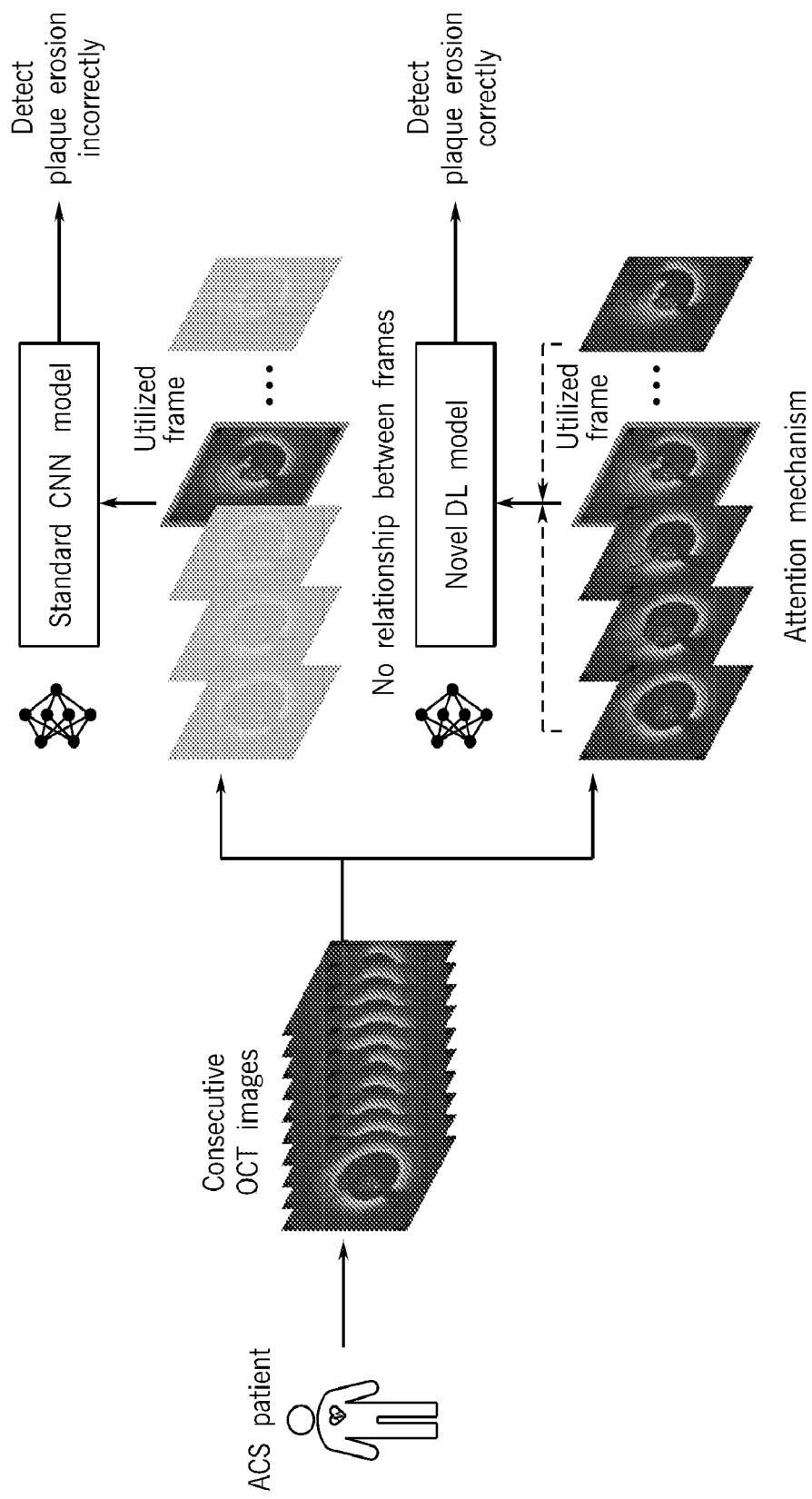
FIG. 2A shows a comparison between the presently-disclosed deep learning (DL) model and a standard convolutional neural network (CNN) model for diagnosis of OCT images. The DL model considers the entire sequence of OCT frames to identify target lesions including adjacent proximal and distal segments, emulating the recognition process of experienced readers who play OCT recordings back and forth to make an accurate diagnosis. On the other hand, the standard CNN model, which cannot integrate information from other frames, only utilizes information of a single frame at a time.

In this study, we aimed to develop DL models to discriminate plaque erosion from other entities. To diagnose a confusing entity-like plaque erosion, an experienced OCT reader refers to adjacent OCT frames by playing OCT recordings back and forth to be confident about the diagnosis of the frame of interest. However, current algorithms based on CNN lack the ability to model inter-frame relationships and are not optimal for analyzing volumetric medical imaging data such as that obtained using OCT. To alleviate this problem, we devised a DL model specialized for a sequential structure, which enhances performance by integrating the information from the entire sequence (FIG. 2A). In particular, our network is based on Transformer architecture leveraging a self-attention mechanism (see below), whose performance is significantly enhanced compared to that of a standard CNN-based model (ResNet-50).

Figure 2B:
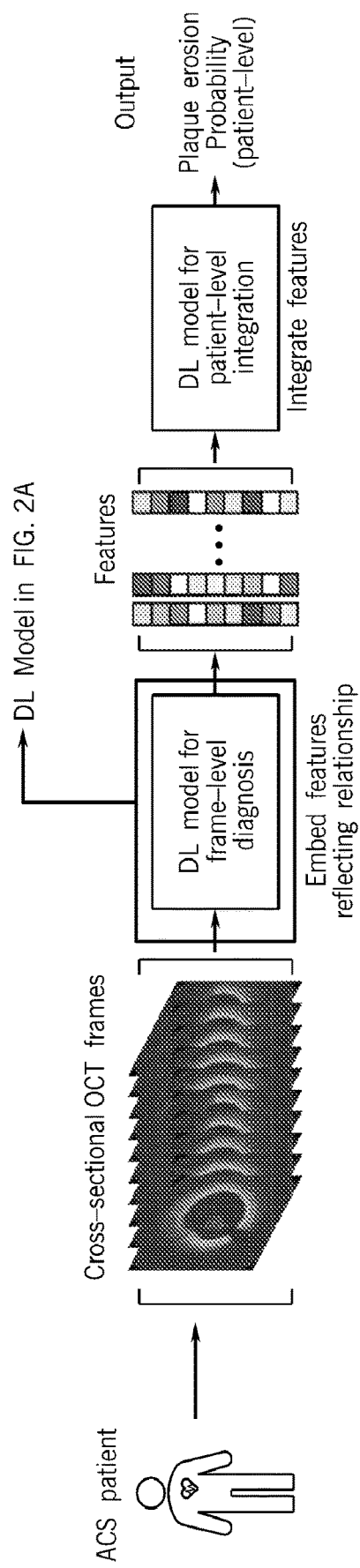
FIG. 2B shows a diagram of an implementation of the presently-disclosed DL model for detecting plaque erosion at the patient-level, which is built on top of the frame-level diagnosis algorithm.

We trained our Transformer-based DL models with frame-level and patient-level annotations to enable the detection of plaque erosion both at the frame-level and at the lesion-level. The model for frame-level diagnosis was trained to detect the plaque erosion within a single frame, while the model for patient-level diagnosis (FIG. 2B) was trained to find a plaque erosion within a sequence of consecutive OCT frames. In detail, we first developed the models for frame-level diagnosis, and then developed the models for patient-level diagnosis, by integrating the outputs of the model for frame-level diagnosis (see below). Since our DL models take a sequence bounded by a fixed length, the sliding window approach was adopted to deal with a variable number of total frames. The logit values are averaged for overlapping frames, which can be considered as a type of self-ensemble. We randomly cut off the OCT frames of a single patient (which may contain 205-540 frames) into smaller blocks (e.g. 180 frames) to increase data variability while maintaining the same input length during the training and processed the OCT image with a longer sequence with the sliding window method during the inference. To yield the optimal performance of a DL model equipped with a Transformer, the following stepwise training strategy was used: 1) first pre-train the backbone part of encoder 2) train the Transformer part with self-supervised contrastive learning 3) fine-tune the model for the downstream task of diagnosing plaque erosion (see below). Details on the development of DL model are provided below. We used five-fold cross validation for the internal validation dataset to fine-tune the model with best hyperparameter and evaluate the performance (see below). To identify the most important regions within a given OCT frame concerning classification result, we generated Grad-CAM based saliency maps.

Statistical Analysis

Continuous variables with a normal distribution were expressed as mean±standard deviation (SD), while the median (interquartile range) was used to summarize non-normally distributed variables. Normally distributed variables were compared using the Student's t-test and non-normally distributed variables were compared using the Mann-Whitney U test. Categorical data were expressed as absolute frequencies and percentages, and compared using the Chi-square test or Fisher exact test, as appropriate.

To evaluate the performance of the model, we adopted a one-versus-rest strategy to calculate the area under the receiver-operating-characteristic curve (AUC) for each of the three labels and averaged to estimate the overall AUC. Likewise, sensitivities, specificities, positive predictive value (PPV), and negative predictive value (NPV) were calculated for each label as well as for overall performance metrics. To further evaluate the diagnostic performance of the model, false-positive rate (FPR) and false-negative rate (FNR) were calculated both at the frame-level and the patient-level. The bootstrapping method was used to estimate the two-sided 95% confidence intervals (CIs) to summarize the sample variability (see below). All analyses were performed using R software version 3.6.2 (R Foundation for Statistical Computing, Vienna, Austria) and Python library scikit-learn version.

For model development and internal validation, we used a total of 237,021 cross-sectional OCT images from 581 patients collected from 8 institutions in 4 countries. Patients were randomly divided five-fold into training (n=465) and internal validation (n=116) datasets, and five-fold cross-validation was performed for the internal validation. Another independent dataset containing a total of 65,394 images from 292 patients collected from a single institution was used for external validation of the DL models.

Patient characteristics of the patients in training/internal validation and external validation datasets are shown in Table 1. When comparing the patients in training/internal validation and external validation datasets, patients in the external validation dataset were younger and more frequently presenting with STEMI. The median number of OCT frames for each patient was 375 (range, 217-540) for the training and internal validation dataset and 217 (range, 206-374) for the external validation dataset. In the training and internal validation dataset, 251 (43.2%) patients had plaque erosion, where 86 (29.5%) patients had plaque erosion in the external validation dataset. At the frame-level, 9700 (4.1%) frames were classified as plaque erosion in the training and internal validation dataset, and 3488 (5.3%) were classified as plaque erosion in the external validation dataset.

TABLE 1

Patient and Lesion Characteristics

| | Total | Training and Validation | External Testing |
|---|---|---|---|
| Number of patients | 873 | 581 | 292 |
| Demographic data | | | |
| Age, years | 61.9 ± 12.1 | 64.4 ± 12.2 | 56.9 ± 10.4 |
| Male | 686 (78.6) | 464 (79.9) | 222 (76.0) |
| BMI, kg/m$^2$ | 25.1 ± 3.6 | 25.0 ± 4.1 | 25.2 ± 2.7 |
| Hypertension | 492 (56.4) | 358 (61.6) | 134 (45.9) |
| Hyperlipidemia | 456 (52.2) | 437 (75.2) | 19 (6.5) |
| Diabetes mellitus | 254 (29.1) | 187 (32.2) | 67 (22.9) |
| Current smoking | 435 (49.8) | 231 (39.8) | 204 (69.9) |
| Renal insufficiency | 114 (13.1) | 106 (18.2) | 8 (2.7) |
| Previous MI | 42 (4.8) | 34 (5.9) | 8 (2.7) |
| Previous PCI | 46 (5.3) | 41 (7.1) | 5 (1.7) |
| Previous CABG | 3 (0.3) | 1 (0.2) | 2 (0.7) |
| Clinical presentation | | | |
| STEMI | 653 (74.8) | 366 (63.0) | 287 (98.3) |
| NSTE-ACS | 220 (25.2) | 215 (37.0) | 5 (1.7) |
| Laboratory data | | | |
| Total cholesterol, mg/dl | 189.5 ± 41.2 | 192.5 ± 40.7 | 183.2 ± 41.5 |
| LDL-C, mg/dl | 127.2 ± 40.4 | 128.5 ± 41.4 | 124.2 ± 37.8 |
| HDL-C, mg/dl | 46.5 ± 11.5 | 46.2 ± 11.6 | 47.4 ± 11.3 |
| Triglycerides, mg/dl | 110.8 (67.0-161.3) | 100.0 (58.0-150.0) | 136.4 (96.6-185.6) |
| HbA1c, % | 6.4 ± 1.3 | 6.3 ± 1.3 | 6.5 ± 1.5 |
| Creatinine, mg/dl | 0.87 ± 0.48 | 0.93 ± 0.57 | 0.75 ± 0.19 |
| Hs-CRP, mg/dl | 0.34 (0.10-4.76) | 0.10 (0.05-0.30) | 7.15 (3.24-12.48) |
| Peak CK, IU/l | 1517.0 (413.8-2995.3) | 1136.0 (270.0-2917.3) | 1997.5 (1083.3-3079.5) |
| Peak CK-MB, IU/l | 160.9 (47.8-296.6) | 132.3 (32.0-291.0) | 182.3 (86.7-313.0) |
| LVEF, % | 56.1 ± 10.2 | 55.7 ± 11.4 | 56.8 ± 8.0 |
| Angiographic data | | | |
| Infarct-related artery | | | |
| RCA | 320 (36.7) | 207 (35.6) | 113 (38.7) |
| LAD | 458 (52.5) | 305 (52.5) | 153 (52.4) |
| LCx | 95 (10.9) | 69 (11.9) | 26 (8.9) |
| Minimum lumen diameter, mm | 0.64 ± 0.63 | 0.42 ± 0.57 | 1.08 ± 0.49 |

TABLE 1-continued

Patient and Lesion Characteristics

|  | Total | Training and Validation | External Testing |
|---|---|---|---|
| Reference vessel diameter, mm | 3.02 ± 0.68 | 2.88 ± 0.70 | 3.31 ± 0.52 |
| Lesion length, mm | 15.9 ± 7.5 | 15.5 ± 6.9 | 16.7 ± 8.6 |
| Diameter stenosis, % | 79.7 ± 18.4 | 86.1 ± 17.1 | 67.2 ± 14.0 |
| OCT findings Pathobiology |  |  |  |
| Plaque erosion | 337 (38.6) | 251 (43.2) | 86 (29.5) |
| Plaque rupture | 536 (61.4) | 330 (56.8) | 206 (70.5) |
| Lipid-rich plaque | 647 (74.1) | 389 (67.0) | 258 (88.4) |
| Thin-cap fibroatheroma | 383 (43.9) | 199 (34.3) | 184 (63.0) |
| Macrophage | 629 (72.1) | 401 (69.0) | 228 (78.1) |
| Cholesterol crystal | 222 (25.4) | 138 (23.8) | 84 (28.8) |
| Calcification | 296 (33.9) | 236 (40.6) | 60 (20.5) |

Notes:
Values shown are n (%), mean ± standard deviation, or median (25th-75th percentile). BMI = body mass index. CABG = coronary artery bypass graft. CK = creatine kinase. CK-MB = creatine kinase-MB. HbA1c = hemoglobin A1c. HDL-C = high-density lipoprotein-cholesterol. Hs-CRP = high-sensitivity C-reactive protein. LAD = left anterior descending artery. LCx = left circumflex artery. LDL-C = low-density lipoprotein-cholesterol. LVEF = left ventricular ejection fraction. MI = myocardial infarction. NSTE-ACS = non-ST-segment elevation acute coronary syndrome. PCI = percutaneous coronary intervention. RCA = right coronary artery. STEMI = ST-segment elevation myocardial infarction.

Figures 3A, 3B:
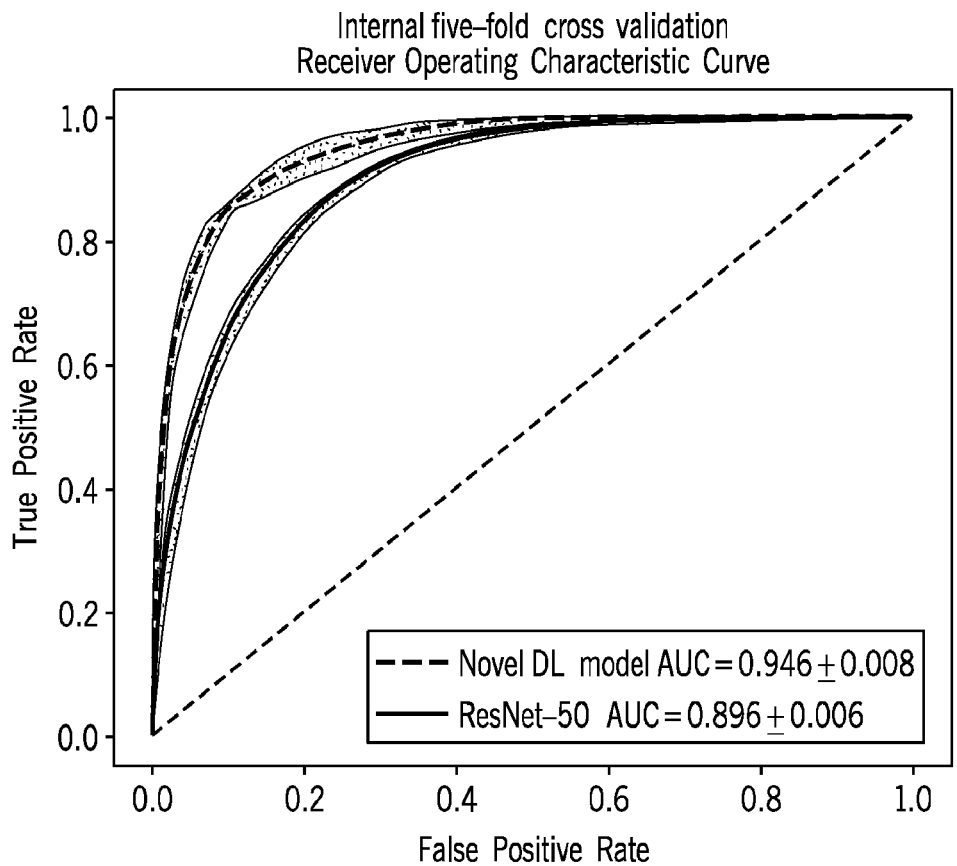
FIG. 3 shows a comparison of performance for diagnosis of plaque erosion at the frame-level. (Panels a, b) In the internal five-fold cross validation, the disclosed DL model showed better performance with an AUC of 0.946 compared to the standard CNN model with an AUC of 0.896 for diagnosis of plaque erosion at the frame-level. (Panels c, d) In the external validation, the disclosed DL model did not show any sign of performance decrease with an AUC of 0.962, while the standard CNN model showed a decrease performance with an AUC of 0.852. DL=deep learning. AUC=area under the curve. CNN=convolutional neural network.
Figures 3C, 3D:
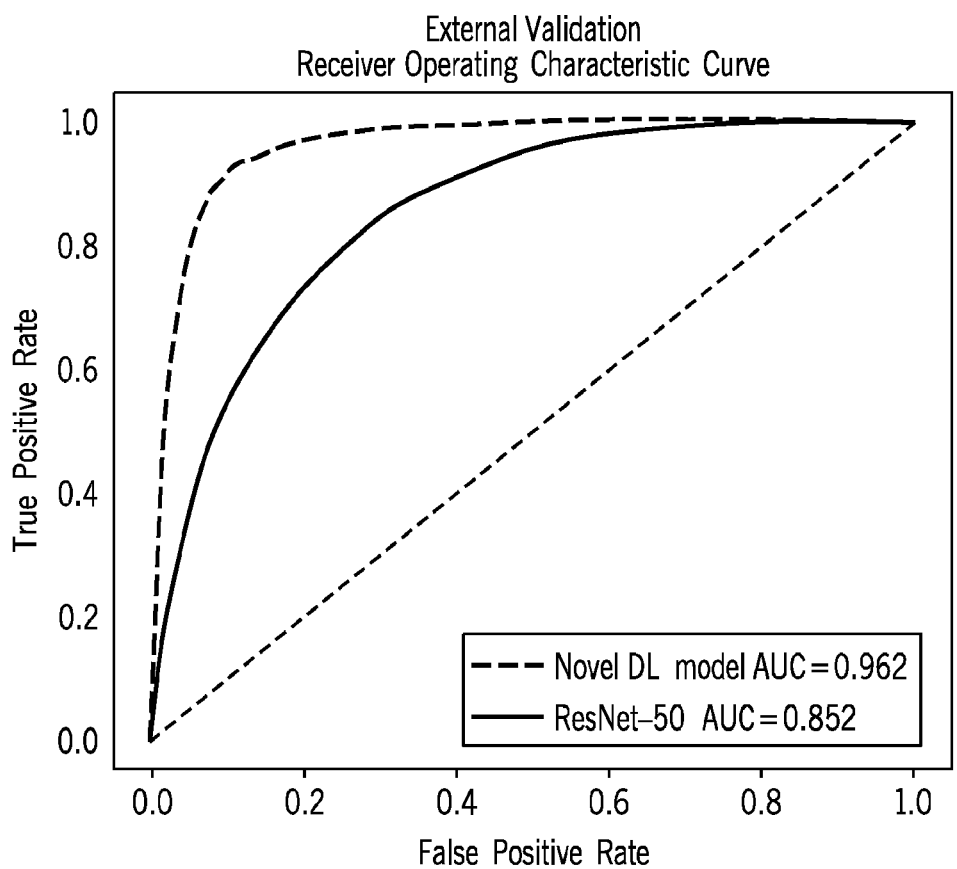
Figure 4A:
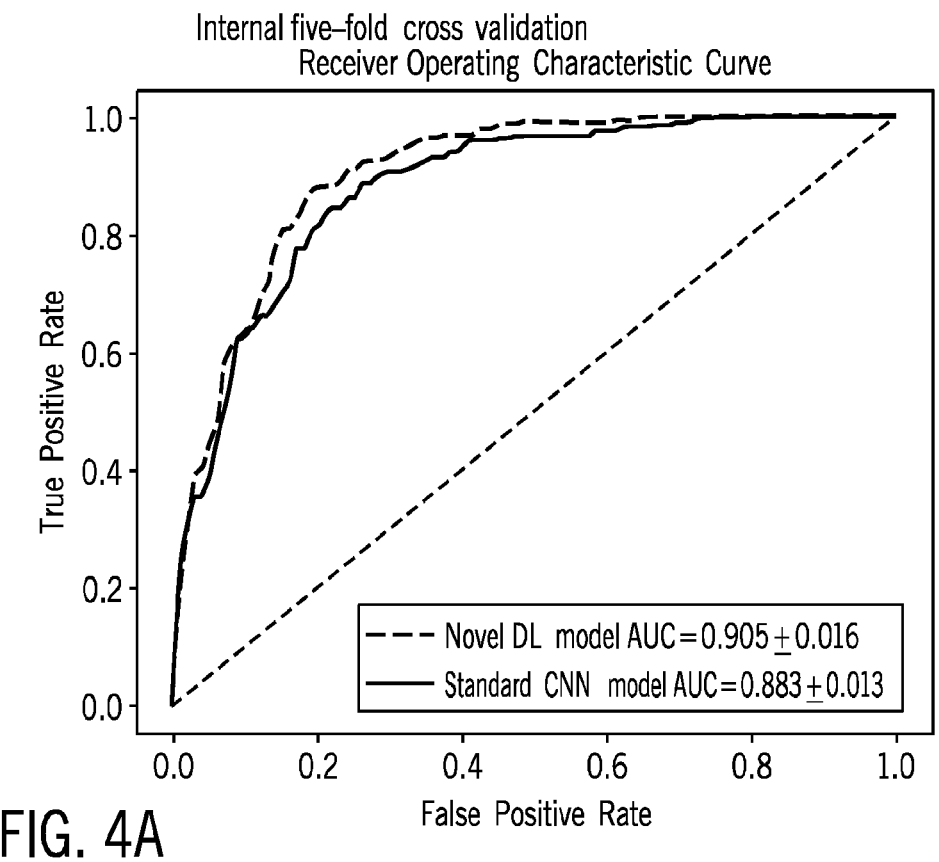
FIG. 4 shows a comparison of performance for diagnosis of plaque erosion at the patient-level. (Panels A, C, D) At the patient level, the disclosed DL model showed slightly better performance with an AUC of 0.905 (Panel A) or 0.899 (Panels C, D) compared to the standard CNN model with an AUC of 0.883 in the internal five-fold cross validation (Panel A). (Panels B, E, F) The performance increase of the disclosed DL model over the standard DL model was more prominent in the external validation, showing the AUC of 0.906 (Panel B) or 0.90 (Panels E, F) for the disclosed DL model compared with AUC of 0.844 for the standard DL model. DL=deep learning. AUC=area under the curve. CNN=convolutional neural network.
Figure 4B:
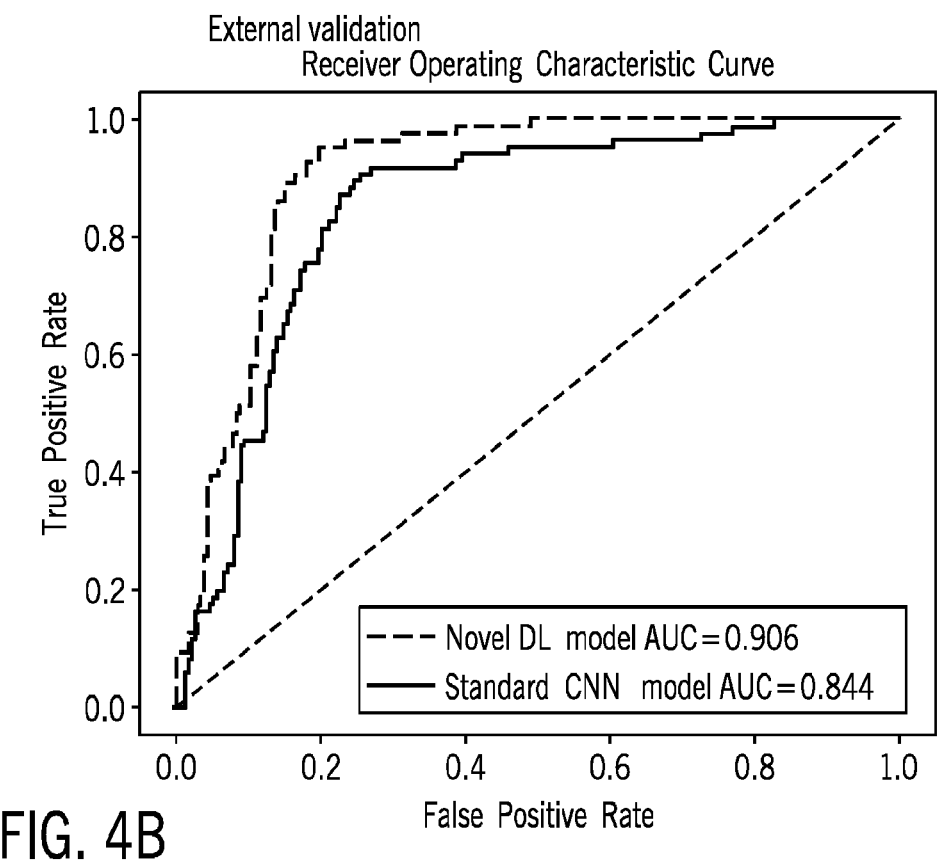
Figures 4C, 4D:
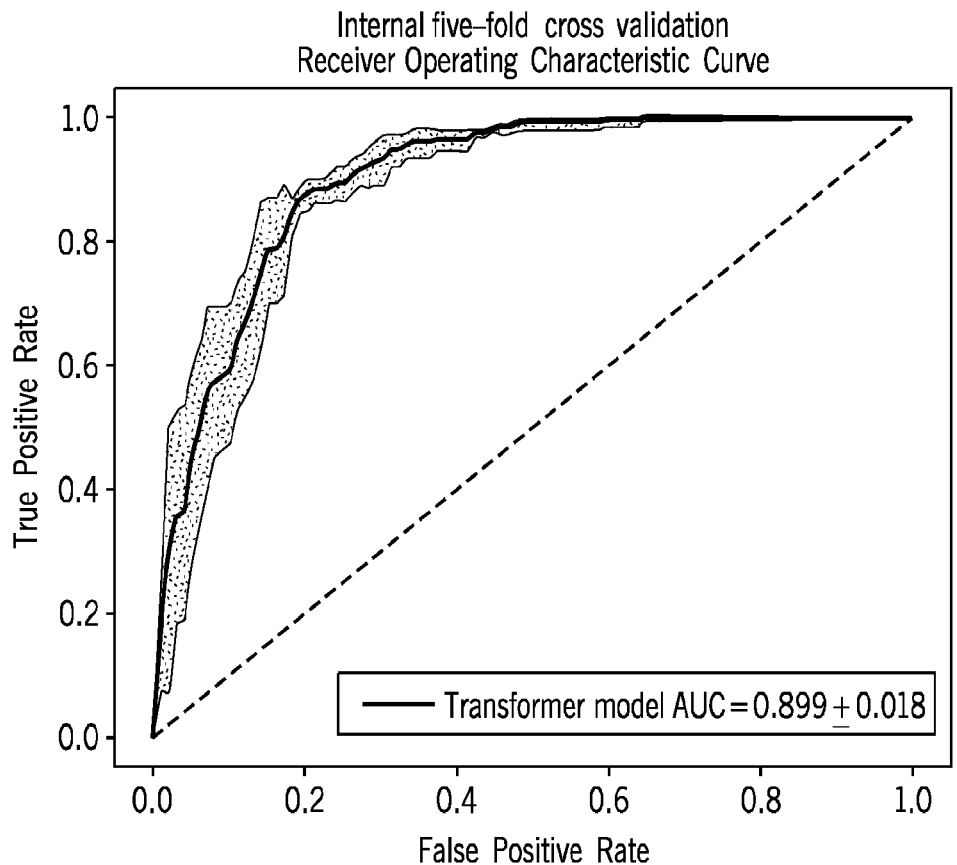
Figures 4E, 4F:
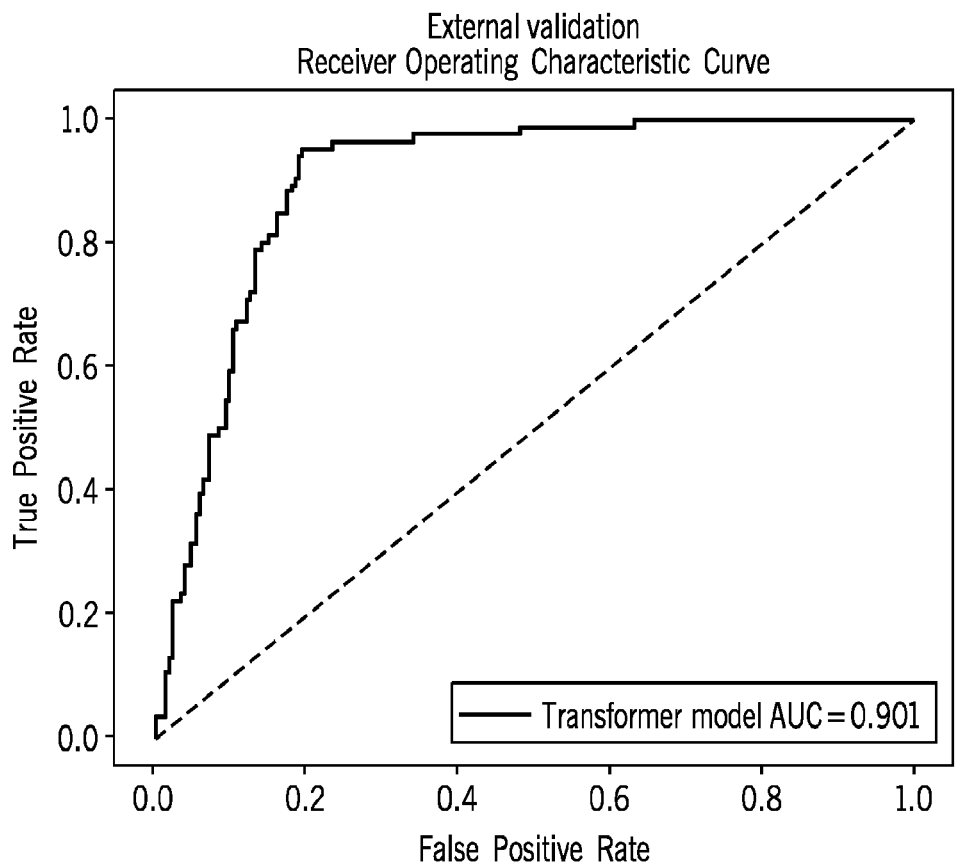

Frame-level diagnostic performances for plaque erosion in the internal and external validation are shown in FIG. 3 and Table 2. In the internal five-fold cross validation, the disclosed DL model significantly outperformed the standard CNN model with an AUC of 0.946, the sensitivity of 81.6%, and specificity of 92.5% to detect plaque erosion within a given OCT frame, compared with those of 0.896, 78.8% and 82.5% for the standard CNN model. The performance increase with the disclosed DL model over the standard CNN model was more prominent in the external validation, showing the AUC of 0.963, the sensitivity of 89.9%, and specificity of 91.2% compared to those with 0.852, 73.4%, and 79.4% of the standard CNN model. In both internal and external validation, the NPVs were more than 95% for all DL models. However, the PPV estimates of the DL models were relatively low, though those were significantly better for the disclosed DL model than the standard CNN model in both internal and external validation.

FIG. 4 and Table 3 provide the performance of DL models for the patient-level diagnosis of plaque erosion in the internal and external validation. In the internal five-fold cross validation, the disclosed DL model showed slightly better performance than the standard CNN-based model, with an AUC of 0.903, the sensitivity of 82.5%, and specificity of 84.5% compared with 0.881, 80.0%, and 82.1% of the standard CNN model. The performance increase with the disclosed DL model over the standard DL model was considerable in the external validation, showing the AUC, sensitivity, and specificity of 0.905, 90.6%, and 83.0% for the disclosed DL model compared with those of 0.844, 91.8%, and 70.4% for the standard CNN model. The NPV and PPV estimates were also significantly higher for the disclosed DL model than the standard CNN model in both internal and external validation.

In the analysis of the false estimate rates, the FPR and FNR were lower with the disclosed DL model than the standard DL model both at the frame-level and the patient-level in all validation settings (Table 4). In the internal five-fold cross-validation, the FPR and FNR of the disclosed DL model were 7.5% and 18.4% for the frame-level diagnosis and 15.6% and 17.5% for the patient-level diagnosis, which was lower than those of 17.4% and 21.2% for the frame-level and 17.9% and 19.9% for the patient-level by the standard CNN model. In the external validation, the disclosed DL model exhibited FPR and FNR of 8.9% and 10.2% at the frame-level, and 17.1% and 9.4% at the patient-level, while those of the standard CNN model were 20.7% and 26.6% at the frame-level, and 29.7% and 8.2% at the patient-level, respectively.

Figure 5:
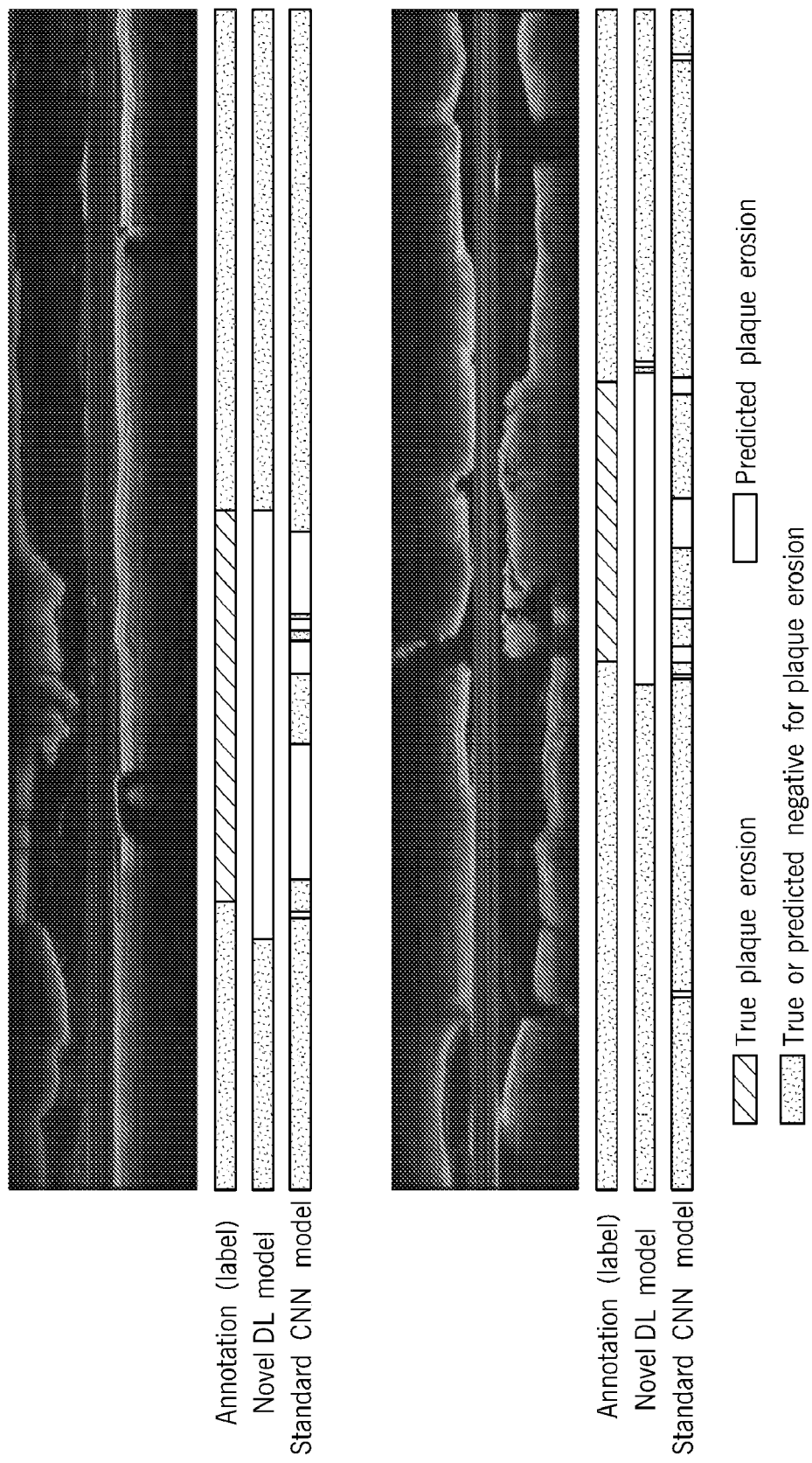
FIG. 5 shows a comparison between the prediction by the DL models and the ground truth annotation. When visualizing the predictions of the two DL models and comparing with the ground truth annotations, the disclosed DL model showed high consistency with the ground truth annotation for each patient, whereas the standard CNN model did not.

To give better interpretation on the DL models, we visualized the models in two ways. First, we visualized the predictions of two DL models and compared with the ground truth annotation. As shown in the representative cases in FIG. 5, the disclosed DL model showed high consistency with the ground truth annotation for each patient, whereas the standard CNN model did not. Secondly, within a single OCT frame, the culprit lesions containing either erosive or ruptured lesions were well localized in the saliency map, suggesting that the DL model makes the diagnoses of each frame based on clinically relevant features within a frame of interest as shown in representative cases in FIG. 14.

Figures 6A, 6B:
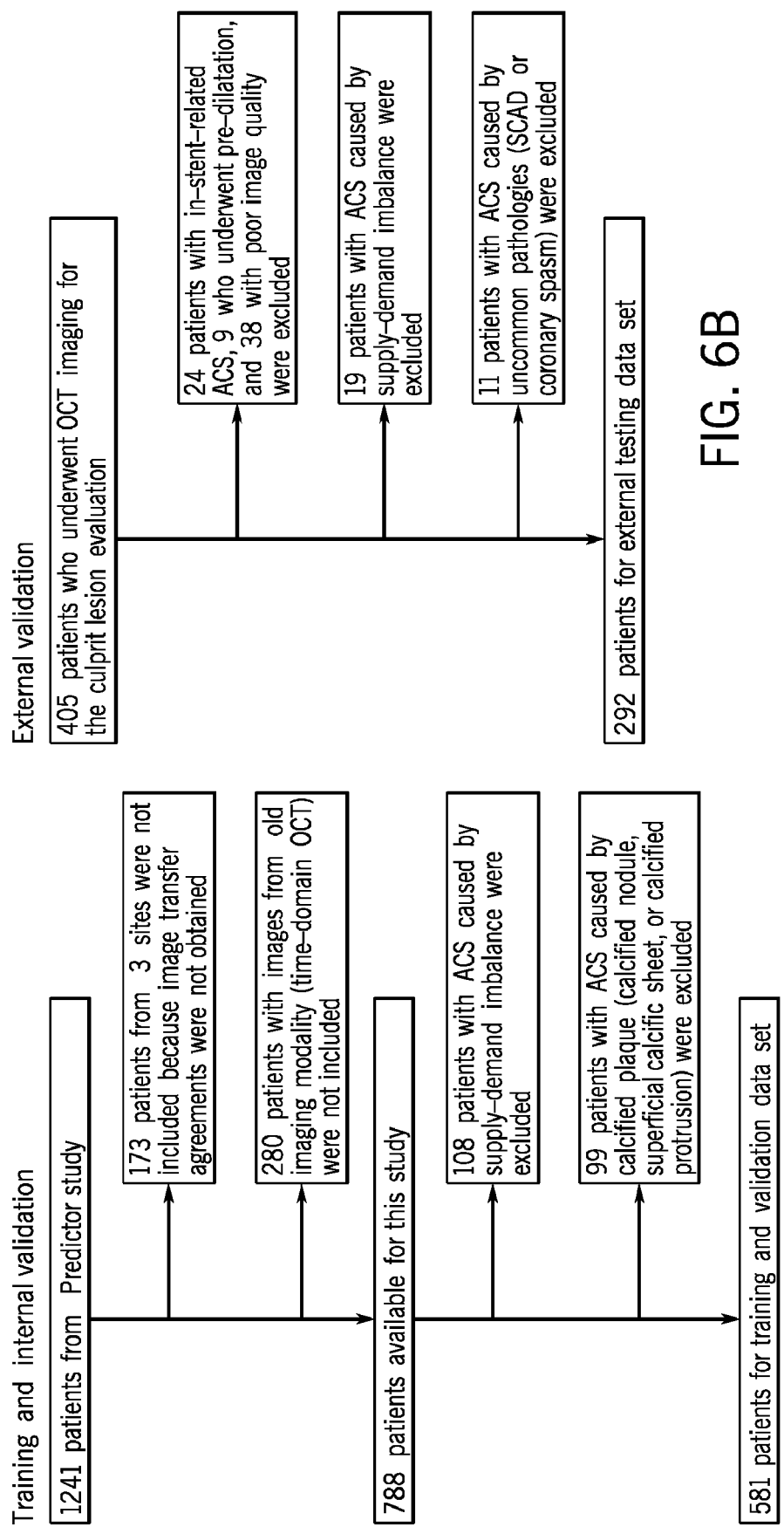
FIG. 6 shows an overview of patient data selection for the disclosed deep learning (DL) model. (Panel A) After excluding ineligible patients, 581 patients from the Identification of Predictors for Coronary Plaque Erosion in Patients with Acute Coronary Syndrome (Predictor) study were used for the training and internal validation dataset. (Panel B) To evaluate the developed model, 292 patients from the Effective Anti-Thrombotic Therapy Without Stenting: Intravascular Optical Coherence Tomography—Based Management in Plaque Erosion (EROSION) study were used as an external validation dataset. OCT=optical coherence tomography. ACS=acute coronary syndrome. SCAD=spontaneous coronary artery dissection.

Definition of the Training, Internal Validation, and External Validation Datasets In deep learning (DL), data is generally divided into two major datasets: "training" and "validation" datasets. These datasets are independent of each other and do not overlap. The primary training data set is also referred to as the "training and internal validation" dataset, as it can be further split into "training" and "validation" datasets. The training dataset is a data set used to train the weights of the network. The deep neural network generally receives subsets called "batch" from the training data set and optimizes its weights via backpropagation. In general, the training is performed by repeating this optimization process until the network finds the optimal weight parameters. As the deep neural network usually overfits the training data during the training, the internal validation dataset is used for this account to determine the hyperparameter such as proper stopping point to prevent overfitting. The external validation dataset is a set used to evaluate the performance of the deep neural network trained and tuned with primary training and internal validation dataset, which contain data obtained at a different institution, usually with different devices and clinical settings. This will ensure how well the network will be generalized in a different dataset, which is related to the clinical applicability of the system. In the current study, we used the Predictor study data, which is from 8 institutions in 4 countries (Table 5, FIG. 6), as the primary training and internal validation dataset, and the EROSION study data, which is from a single institution, as the external validation dataset.

TABLE 5

Summary of the Countries and Institutions of the Predictor Study

| Participating sites | Country | Number of included patients |
|---|---|---|
| Nara Medical University Hospital | Japan | 150 |
| Nippon Medical Chiba Hokusoh Hospital | Japan | 109 |
| Hirosaki University Hospital | Japan | 88 |
| Massachusetts General Hospital | US | 72 |
| The Chinese University of Hong Kong | Hong Kong | 61 |
| Tsuchiura Kyodo General Hospital | Japan | 59 |
| Kitasato University Hospital | Japan | 22 |
| University Hospitals Leuven | Belgium | 20 |
| Total | | 581 |

Development of the DL Model

A convolution neural network also referred to as CNN, is a type of deep neural network devised to process structured array data such as images. CNN has been widely used because of its outstanding performance in computer vision and has recorded state-of-the-art performance in many tasks such as classification, object detection, and segmentation. In particular, CNN is specialized to extract useful patterns called features from images thanks to the convolution operation, which is the driving force that makes CNN strong in various visual applications. CNN requires little or no pre-processing and can be used directly for raw images in many cases. However, as a CNN-based classification network was originally invented to deal with 2-dimensional (2D) images in computer vision, it is more suitable for 2D medical images like X-ray or fundus ophthalmoscopy rather than volumetric image data such as magnetic resonance imaging (MM) or computed tomography (CT). Although some variant CNNs have been proposed to deal with volumetric image data, many limitations still exist such as the use of excessive memory to handle the data volume, the lack of a method to integrate the information from distant frames, and so forth.

The Transformer is a network architecture proposed for natural language processing (NLP) where it is required to handle long sequence data like sentences. Unlike previous models for NLP such as recurrent neural network or long-short-term-memory, Transformer offers a different way to handle the sequenced data, not by processing them one-by-one, but by treating the entire sequence data all at once. It uses a self-attention mechanism to estimate the weights for each component of the sequence to make a prediction and transforms a given embedding vector to a transformed embedding vector that contains the information of the entire sequence after applying the self-attention weights. Though initially designed for NLP, the concept of utilizing information of the entire sequence with a self-attention mechanism can also be applied to image data with sequence or volume. Therefore, we devised a DL model specializing in volumetric image data that enables the integration of the information from the entire sequence by conjugating CNN and Transformer.

Figure 8:
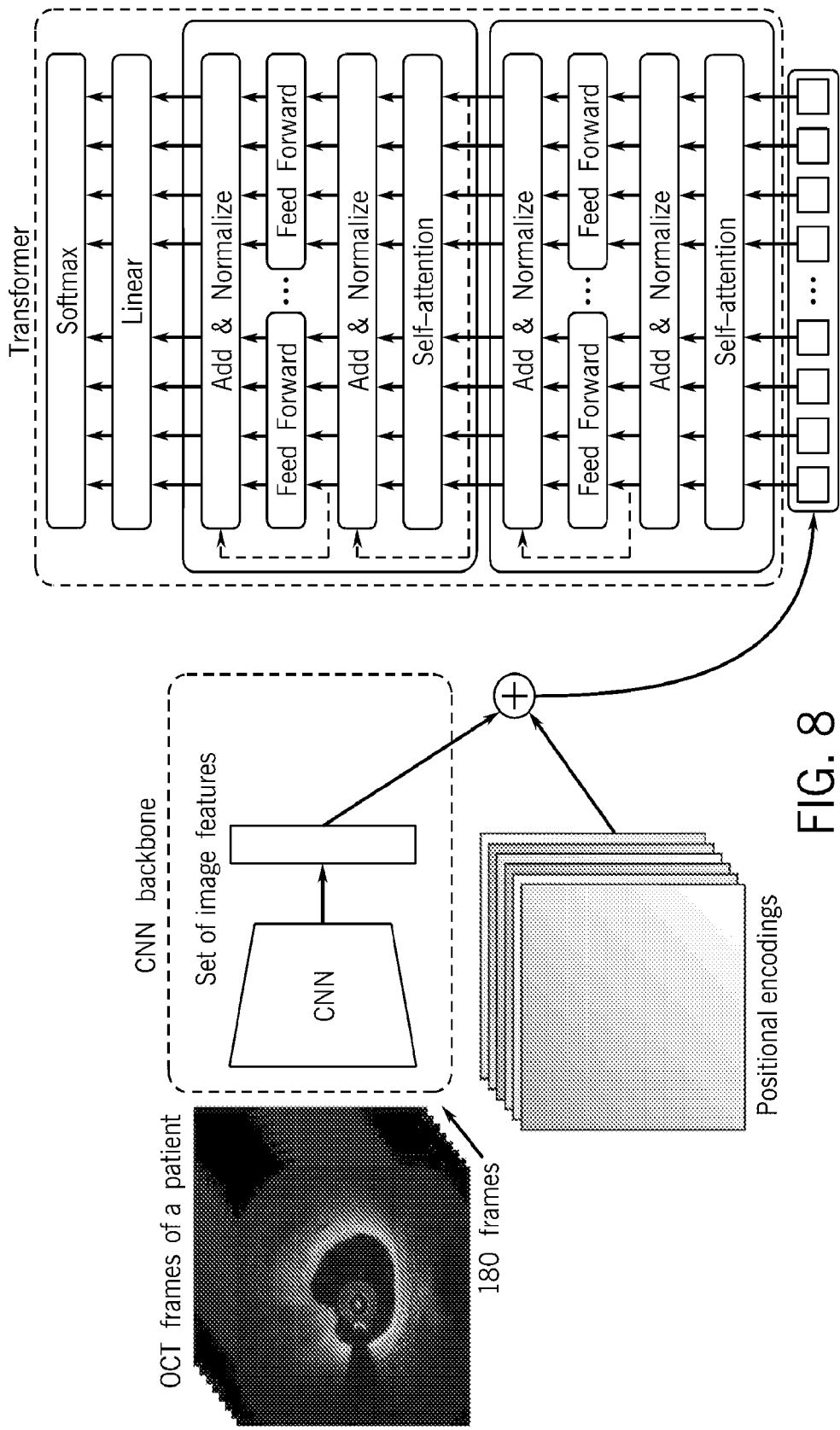
FIG. 8 shows an architecture of the disclosed deep learning (DL) model (Image Sequence Transformer). The disclosed DL model includes the convolutional neural network (CNN) backbone which encodes optical coherence tomography (OCT) frames into the set of image features and the two Transformer-encoder layers tailored to utilize both global and local attention for sequential OCT frames.

A detailed description of the disclosed DL model is provided in FIG. 8. To obtain embedding similar to the word embedding of the original Transformer, we used the CNN backbone to extract image features. In detail, the input intravascular OCT images were first resized to 224×224 and fed into the CNN backbone to make image features with 2048 dimensions. The resulting image features were then used as input of the Transformer-encoder, which was followed by a linear classifier (FIG. 8). For training, we randomly cut off the OCT frames of a single patient which contain 205 to 540 frames into smaller blocks (e.g. 180 frames) to increase data variability while maintaining the same input length. To fully utilize the benefit from the Transformer architecture, we adopted the pre-training and fine-tuning methods introduced in Bidirectional Encoder Representations from Transformers (BERT). The details of our training scheme are described in FIG. 9. First, we trained the CNN backbone (ResNet-50 initialized with ImageNet pre-trained weights), which can also be referred to as the conventional CNN model, with a standard supervised learning approach (FIG. 10(A)). The trained weights were then transferred to the CNN backbone part of the disclosed DL model (FIG. 10(B)). The disclosed DL model learned to incorporate the sequenced structures of image embedding by a self-supervised, contrastive learning method with various augmentations (rotation, scaling, shearing, flipping, cutting out, and shrinking sequences) inspired by the prior work and fine-tuned with standard supervised learning for the downstream task (FIG. 10(C)) to classify three labels: plaque rupture, plaque erosion, and others. The details about the hyperparameters used for each training phase are provided in Table 6.

TABLE 6

Summary of Hyperparameters of the Deep Learning (DL) Model

| Hyperparameters | Value |
|---|---|
| Training of CNN backbone and standard CNN model | |
| Input image size | 224 × 224 |
| Batch size | 360 |
| Learning rate | 0.000002 |
| Learning rate scheduler | OneCycleLR |
| Optimizer | AdamW |
| Epochs | 20 |
| Image feature dimension | 2048 |
| Dropout ratio | 0.1 |
| Weight decay coefficient | 0.1 |
| Self-supervised pre-training of the disclosed DL model | |
| Input image size | 224 × 224 |
| Batch size | 2 |
| Sequence length | 180 |
| Transformer encoder layer number | 2 |
| Attention head number | 1 |
| Learning rate for CNN backbone | 0.000002 |
| Learning rate for Transformer | 0.00002 |
| Learning rate scheduler | OneCycleLR |
| Optimizer | AdamW |
| Epochs | 30 |
| Image feature dimension | 2048 |
| Dropout ratio | 0.1 |
| Weight decay coefficient | 0.1 |
| Gradient clipping | 0.5 |
| Supervised fine-tuning of the disclosed DL model | |
| Input image size | 224 × 224 |
| Batch size | 5 |
| Sequence length | 180 |
| Transformer encoder layer number | 2 |
| Attention head number | 1 |
| Learning rate for CNN backbone | 0.0000008 |
| Learning rate for Transformer | 0.000008 |
| Learning rate scheduler | OneCycleLR |
| Optimizer | AdamW |
| Epochs | 30 |
| Image feature dimension | 2048 |

TABLE 6-continued

Summary of Hyperparameters of the Deep Learning (DL) Model

| Hyperparameters | Value |
|---|---|
| Dropout ratio | 0.1 |
| Weight decay coefficient | 0.1 |
| Gradient clipping | 0.5 |

CNN = convolutional neural network. OneCycleLR = one-cycle learning rate.

As the dataset contains different numbers of images for each label (9,700 frames for plaque erosion, 8,909 frames for plaque rupture, and 218,412 frames for others), we adjusted weight values for each class to mitigate the problem of an imbalanced data sample between the classes during the training and validation. The weighted cross-entropy loss function was defined as below.

$$Loss = -\Sigma weight[class] y[class] \log(p[class])$$

where weight[class] is the class weight, y[class] is the label for the class, and p[class] is the predicted probability for the class. We calculated the weight value for each class to be inversely proportional to the number of images for each label. By this method, more weights were given to labels with a small number of images, while fewer weights were given to a label with a large number of images to affect the network parameters with a similar amount during the training process. With the concept of the Bayesian inference, we also applied additional weights for each label to satisfy the pre-defined sensitivity (>0.80) for each label, defined as below.

$$P_{weighted}[class] = \frac{weight[class] p[class]}{\sum weight[class] p[class]}$$

where $P_{weighted}[class]$ stands for the weighted probability for the class, weight[class] is the class weight, and p[class] is the predicted probability for the class by the model.

In addition, we adapted the disclosed DL model for the diagnosis of plaque erosion at the patient-level. The modified version of the disclosed DL model for patient-level diagnosis is illustrated in FIG. 8. We transferred the weights of the disclosed DL model trained for frame-level diagnosis and added the Transformer layer after prepending the learnable [cls] token to embed the context of the entire sequence.

Five-Fold Cross Validation and Hyperparameter Tuning

In the current study, we used the five-fold cross validation method consisting of two steps. First, the Predictor study data were split into the primary training and validation data set with a 4:1 ratio to construct five-fold cross validation datasets that do not overlap. We ran the internal five-fold cross validation to train five separate models to evaluate the performances and averaged them to get the overall performance over those models. The average performance of five models was used for hyperparameters tuning by changing the hyperparameters and evaluating the average performance repeatedly until getting the best performance. The hyperparameters tuned with this method include learning rate (range from 0.000001 to 0.01), learning rate schedule (constant, step decay, exponential decay, one-cycle learning rate policy), optimizer (SGD, Adam, AdamW), batch size (range from 1 to 8), total training epoch (range from 10 to 100), and gradient clipping (no gradient clipping, 0.5, 1.0). Second, the primary training and internal validation datasets were integrated into the entire training dataset, and a new network was re-trained with this entire training dataset using the best hyperparameters obtained from the cross-validation process. This network was then used to evaluate the final performance of the model in the external validation (the EROSION study data).

Bootstrap Sampling Method for Confidence Interval Estimation

The bootstrapping method was used to estimate the 95% confidence intervals (CIs) of the performance metrics for classification, which include area under the receiver-operating characteristic curve, sensitivity, specificity, and accuracy. In detail, we performed n-out-of-n bootstrapping with replacement. The bootstrap sampling was repeated 1000 times at the patient level, and the performance metrics were recorded for each time. Finally, we estimated a 95% CI from the distribution of recorded values.

To the best of our knowledge, this is the first study to enable end-to-end diagnosis of challenging features like plaque erosion using OCT images. To this end, we devised a DL model leveraging the attention mechanism of Transformer to integrate information of the entire sequence, which resembles the interpretation process of OCT experts, and compared its performance with CNN-based DL models. Our results reveal that the disclosed DL model can accurately diagnose plaque erosion at the patient-level as well as the frame-level, which was not possible with the standard CNN-based DL model.

Plaque erosion and plaque rupture are distinctly different entities. Plaque erosion is characterized by a plaque with an intact fibrous cap and preserved vascular integrity, whereas plaque rupture occurs at a lipid plaque with a necrotic core exposed to circulating blood following rupture of the fibrous cap. Luminal thrombus in plaque erosion has been attributed to apoptosis or denudation of superficial endothelial cells and is typically rich in platelets. These unique features of plaque erosion indicate that thrombus removal and effective anti-thrombotic therapy without stent implantation may be sufficient to restore and maintain coronary artery patency, while the endothelial layer heals. Indeed, a recent study reported that patients with ACS caused by plaque erosion might be stabilized by effective anti-thrombotic therapy without stent implantation, thereby abrogating early and late stent-related complications. However, one potential problem of this strategy is the difficulty of accurate diagnosis of plaque erosion. Currently, plaque erosion is frequently diagnosed by excluding the presence of plaque rupture at the culprit lesion in ACS patients, due to the difficulty of accurately diagnosing plaque erosion directly. In addition, it may be difficult for interventional cardiologists to take enough time to focus on image interpretation during emergency coronary intervention. In contrast, the deep learning model disclosed herein requires only a few seconds to provide a diagnosis with high accuracy and may identify patients with plaque erosion who could potentially benefit from conservative therapy.

Despite the success and rapid adaptation of deep learning in certain areas of medical imaging, only a few studies have reported a DL-based diagnosis of specific OCT findings. For example, one group has reported that a deep learning model can detect a specific plaque phenotype, thin-cap fibroatheroma (TCFA), but data in that particular study was obtained from only a single research center without external validation, which may have resulted in overfitting to the included population. In contrast, the current study has utilized large and well-curated databases of two independent studies collected from multiple institutions and countries for training, internal validation, and external validation. In the experiments, the disclosed DL model did not show any sign of the performance degradation in the external validation, while the standard CNN model showed a significant decrease in performance in the external validation, assuring superior generalization capability of the disclosed DL model which is crucial for real-world application.

In addition, previous studies of deep learning applications using OCT data have only leveraged the CNN architecture, which was not optimal to process sequenced image structures like OCT. When OCT experts diagnose plaque erosion, they assess a set of OCT frames as a group so as not to miss plaque rupture in the patient. Because of this complex recognition process, the standard CNN-based model which produces classification results based only on the selected frame failed to show optimal performance for diagnosis of plaque erosion in this study. The experimental results suggest that the direct application of CNN-based DL developed for computer vision is not suitable for specialized medical imaging like OCT. Instead, we devised a DL model tailored for image structure leveraging Transformer, which was originally developed for natural language processing. The disclosed DL model takes into account the entirety of the sequences of OCT frames to identify target lesions including adjacent proximal and distal segments, emulating the interpretation process of experienced readers who review images in context (e.g. play OCT recordings back and forth) in order to make an accurate diagnosis. As a result, the disclosed DL model attained significantly better performance compared with the standard CNN model for diagnosis of plaque erosion, which as noted previously is a challenging feature to diagnose due to the less discernible changes in a plaque erosion as compared to conditions such as plaque rupture.

A drawback of some DL models can be a lack of interpretability. The features used by deep learning models to make a diagnosis are often unknown. Identifying these features could be of importance because they might offer novel findings that could provide new therapeutic targets or allow for more certainty for clinicians who are trying to understand what drives the model's interpretation. To mitigate this potential drawback, we visualized the attention of DL models with Grad-CAM, which provides transparent insight into the model's attention within a given OCT frame. Although further studies are required, visualization of lesion locations obtained from our model can be annotated on real-time OCT images and provide an accurate diagnosis to cardiologists.

The disclosed approach may have certain limitations. First, interpretation by experienced readers was used as the ground truth. This approach was taken, as it was impossible to use histology validation for the development of a new deep learning model using intracoronary imaging. Nevertheless, using interpretation by experienced readers to develop the ground truth has been widely used in developing DL models in medical imaging when validation with histologic examination is not available. For this reason, the comparison of the DL model with the human experts was not feasible, since the performance of the experts, which was used as ground truth label, is the upper bound of model performance. Second, the decision to perform OCT was left at the discretion of each operator, although OCT was routinely used at the participating institutions. Patients with poor OCT image quality were excluded. Therefore, a certain amount of selection bias cannot be completely excluded. Third, since we focused on the diagnosis of plaque erosion and plaque rupture for comparison, less common ACS pathologies such as calcified nodule, spontaneous coronary dissection, or intraplaque hemorrhage were not included. Fourth, although this is the largest study so far, the number of subjects may not be sufficient to generalize the results of the current study.

Nevertheless, this Example has demonstrated that the disclosed DL model, equipped with a Transformer module to be tailored for image data with sequence, significantly improved diagnostic performance of plaque erosion in patients with ACS compared to the standard CNN models. Further investigation is required to evaluate the possible routine application of the disclosed diagnostic model, which will further facilitate the widespread use of OCT in clinical practice.

Example 2

Development of a DL Model to Diagnose Plaque Erosion in Patients with ACS

An image sequence transformer DL algorithm that mirrors the attention given by cardiologists to sequential images during a pull-back was developed. The DL model was trained and internally validated for a diagnosis of plaque erosion both at the frame-level and at the patient-level in 581 patients from 8 institutions in 4 countries. The model was externally tested in 292 patients from an independent dataset. Data were analyzed between Nov. 21, 2020, and Apr. 5, 2021.

Training and validation was performed using a database of 237,021 OCT images from 581 patients, and testing was performed using an independent database of 65,394 OCT images from 292 patients. Main Outcomes and Measures: The OCT image classification performance was evaluated by area under the receiver-operating characteristic curve (AUC), and sensitivity and specificity. The results were compared against diagnoses made by OCT experts both at the frame-level and at the patient-level.

In the training and validation data set, 206 (43.2%) patients had plaque erosion, while in the external testing data set, 86 (29.5%) patients had plaque erosion. In the external testing data set, the DL model diagnosed plaque erosion with an AUC of 0.963 (95% CI, 0.962-0.963), a sensitivity of 89.9% (95% CI, 89.7-90.0), and a specificity of 91.1% (95% CI, 91.1-91.2) at the frame-level. At the patient-level, the DL model detected plaque erosion with an AUC of 0.901 (95% CI, 0.900-0.902), a sensitivity of 89.6% (95% CI, 89.4-89.8), and a specificity of 82.0% (95% CI, 81.9-82.2).

Ethical Approval

The Identification of Predictors for Coronary Plaque Erosion in Patients with Acute Coronary Syndrome study (the Predictor study, NCT03479723) and the Effective Anti-Thrombotic Therapy Without Stenting: Intravascular Optical Coherence Tomography—Based Management in Plaque Erosion study (the EROSION study, NCT02041650) were approved by the Institutional Review Board at each participating site. For the Predictor registry, informed consent was waived. For the EROSION study, written informed consent was obtained prior to enrollment.

Deep Learning Model

Figure 10:
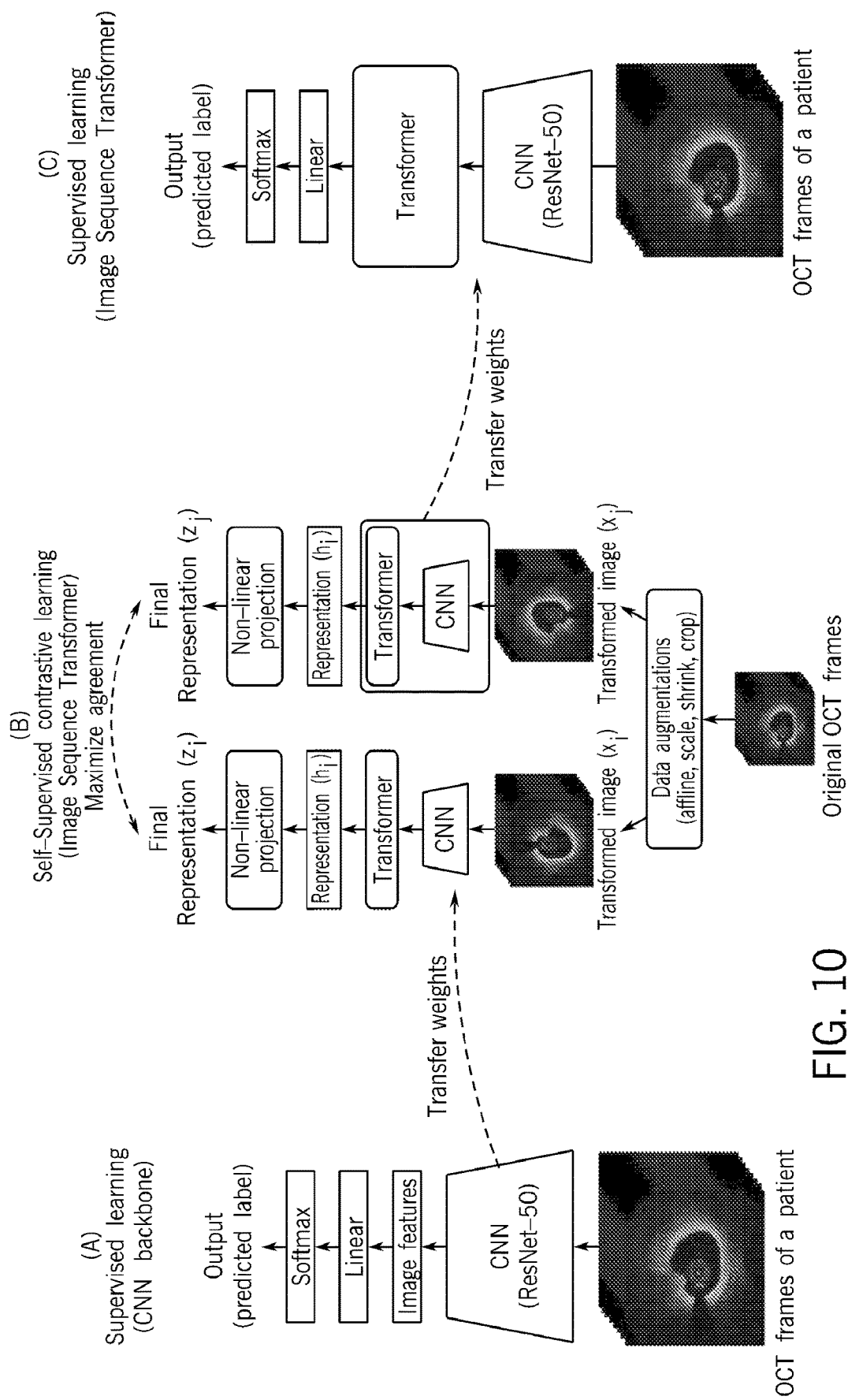
FIG. 10 shows a training scheme of the disclosed deep learning (DL) model (Image Sequence Transformer). The training of the disclosed DL model may include three steps. (Panel A) First, the convolutional neural network (CNN) backbone may be trained in a supervised manner. (Panel B) Second, the weights may be transferred and the disclosed DL model may be trained with self-supervised contrastive learning. (Panel C) Finally, the model may be fine-tuned for downstream tasks using the supervised learning method. OCT=optical coherence tomography.
Figure 11:
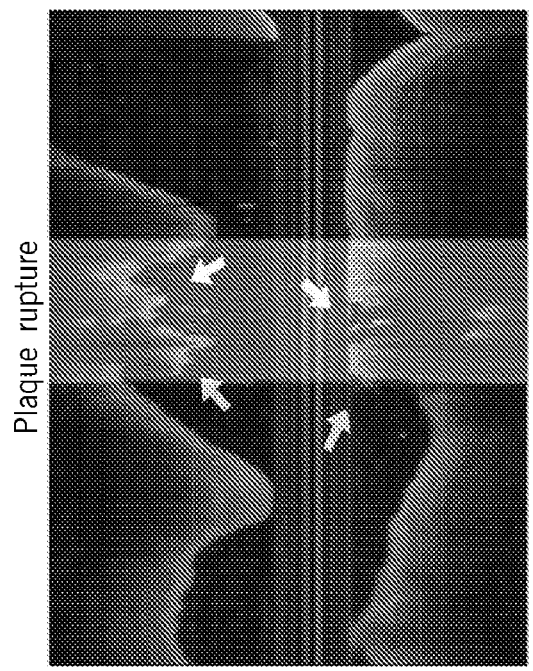
FIG. 11 shows an example of an attention weight matrix in which the network attention was visualized at the lesion-level in the external testing data set. The frames that contain target lesions were localized by the self-attention mechanism of the disclosed model (white-shaded location) as depicted in the illustrated cases. The white arrows show the location of the target lesions.
Figure 11:
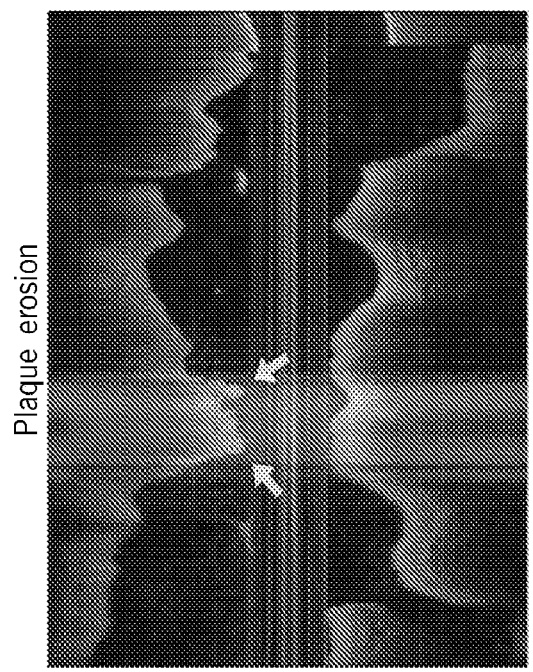
Figure 13A:
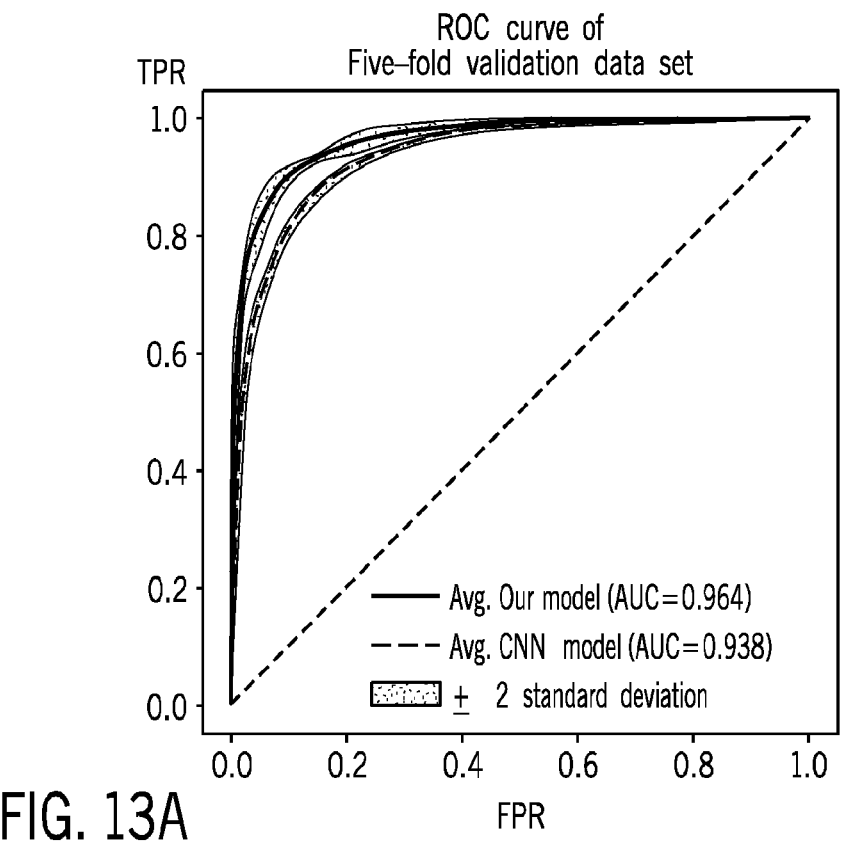
FIG. 13 shows ROC curves for the disclosed model and for a conventional CNN model in the five-fold cross validation data set and external testing data set. (Panel A) The disclosed model showed better performance compared to the conventional convolutional neural network (CNN) model in the five-fold cross validation data set, and (Panel B) the improvement was more prominent in the external testing data set with an overall area under the receiver-operating characteristic curve (AUC) of 0.959 (95% confidence interval [CI], 0.959-0.959) vs. 0.911 (95% CI, 0.910-0.911). (Panel C) The performance increase was more prominent for diagnosis of plaque erosion (PE), (Panel D) while both models can accurately diagnose plaque rupture, implying that our model was especially beneficial for challenging cases (plaque erosion) rather than obvious ones (plaque rupture). ROC indicates receiver operating characteristics, and TPR, FPR indicate the true positive rate and false positive rate, respectively.
Figure 13B:
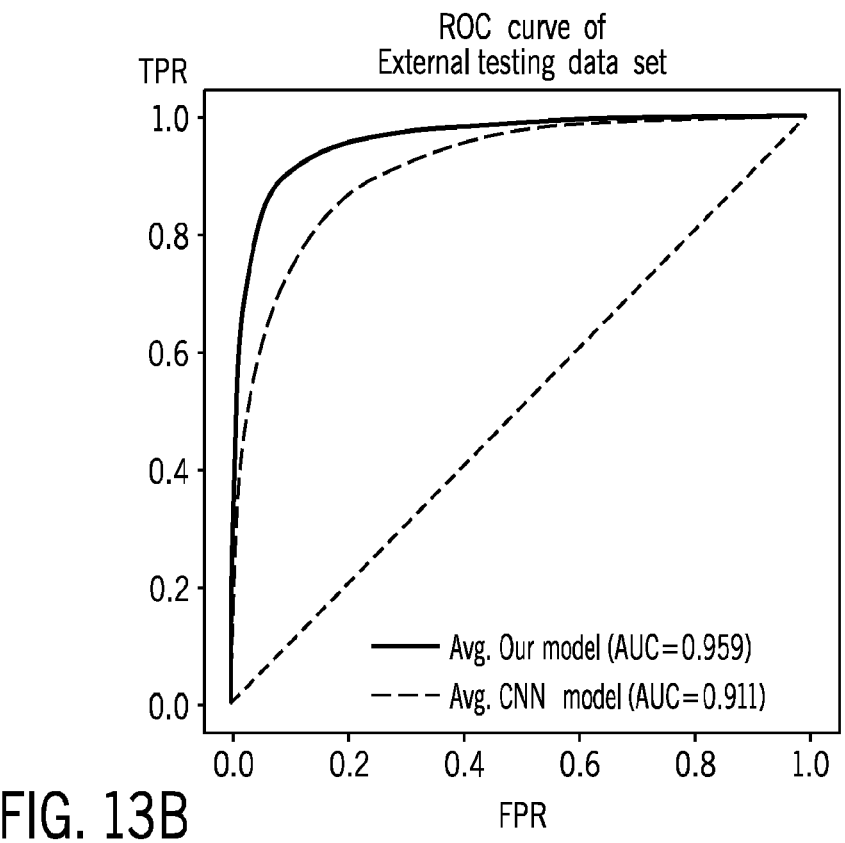
Figure 13C:
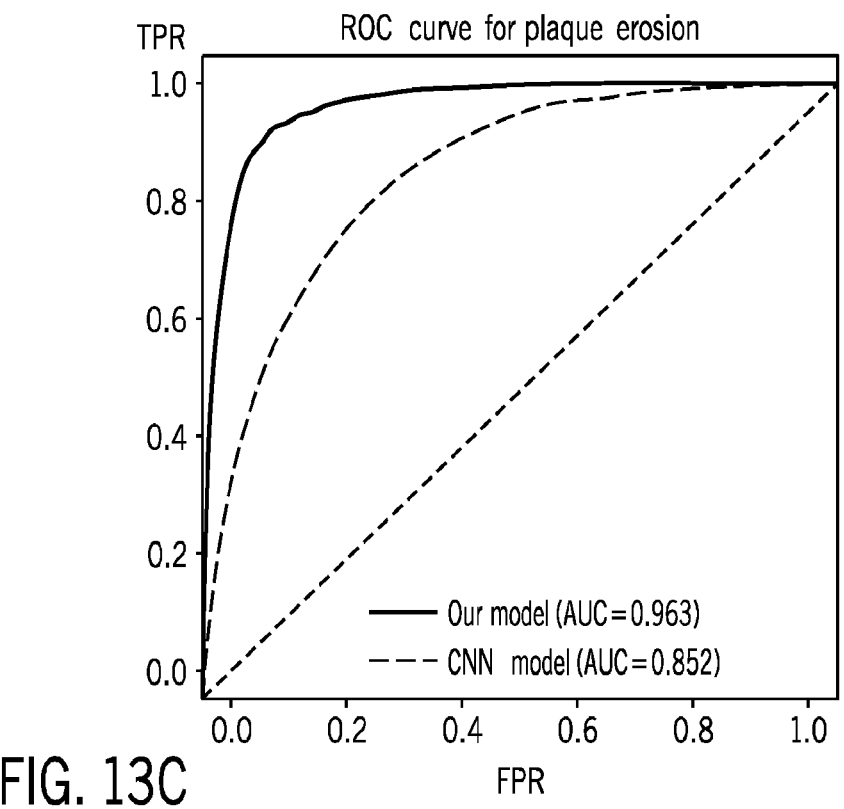
Figure 13D:
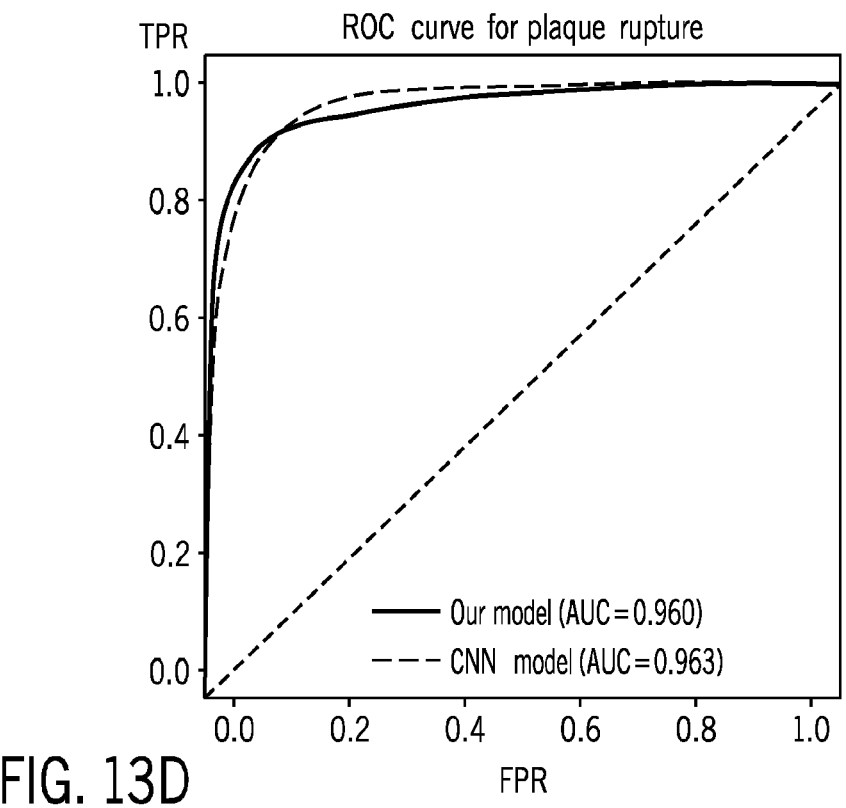

DL is a method subject to machine learning that has "deep" architecture to learn complex hierarchical representation from a dataset with many hidden layers, enabling the abstract nonlinear representation of the underlying data. Conventional neural network (CNN), although widely used in deep learning, holds the significant limitation that it may not be able to model long-term dependency in sequential structure and therefore is not optimal for volumetric medical images (e.g. OCT, computed tomography, magnetic resonance image), notwithstanding its astounding performance in many vision tasks. To alleviate this problem, we developed a model referred to as Image Sequence Transformer, a DL model specialized for a sequential structure, which enhances performance by integrating the information from the entire sequence with a self-attention mechanism (FIG. 8, FIG. 10, FIG. 11, and Table 7).

Figure 9:
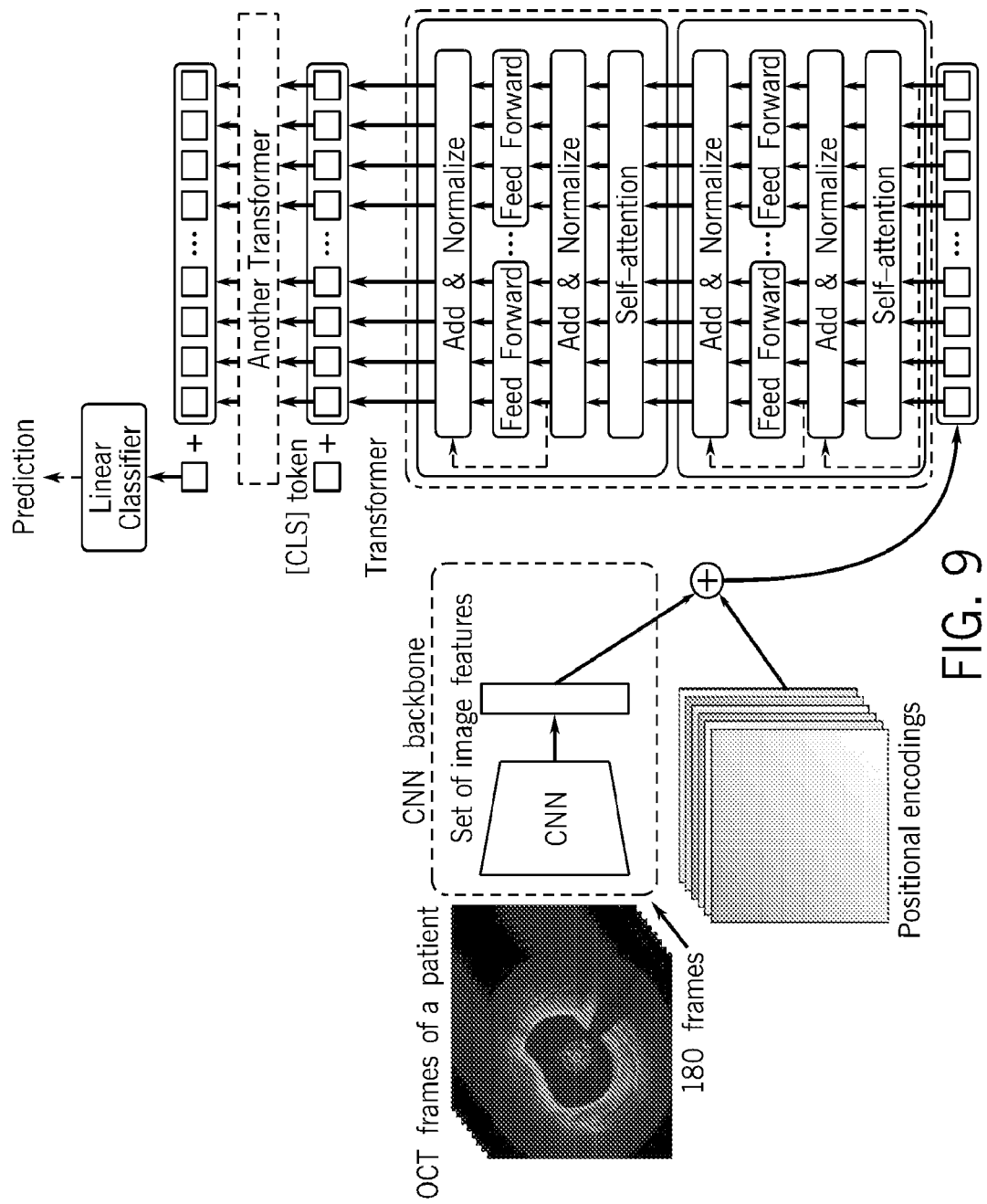
FIG. 9 shows a modified Image Sequence Transformer for patient-level diagnosis. The Image Sequence Transformer was adapted to diagnose plaque rupture and plaque erosion at the patient level. An additional Transformer layer was added to the Image Sequence Transformer architecture after prepending a learnable [cls] (classification) token to embed the context of the entire sequence.

We trained the DL model with frame-level and the lesion-level annotations to enable the detection of the target lesion both at the frame-level and at the lesion-level. The model for frame-level classification was trained to detect the presence of either plaque rupture or plaque erosion within a single frame, while the model for lesion-level classification was trained to find either the plaque rupture or erosion within a fixed-length segment of sequential OCT frames (FIG. 9). For frame-level classification, the DL model was compared with a conventional CNN model trained with the same data sets and settings. For lesion-level classification, the diagnostic performance of the DL model at the patient-level was evaluated by defining a main lesion in each patient. The ability of the model to correctly detect the target lesion in each patient within the segment containing the main lesion was evaluated.

Five-fold cross-validation was performed to develop and optimize the hyperparameters of the DL model, and the diagnostic performance was then assessed in the independent external testing data set.

Study Design

Patients presenting with ACS who had pre-intervention OCT imaging of the culprit lesion were selected for the training and validation data set from the Predictor study. The Predictor study was an international, multi-center, registry that included ACS patients who underwent OCT at 11 institutions in 6 countries and sought to identify clinical findings associated with the existence of plaque erosion. The data used for the current project was from 8 institutions in 4 countries (Table 8). To externally validate the developed model, patients from the EROSION study were used as a testing data set. The EROSION study was a single-center, prospective study that included ACS patients undergoing OCT and tested the safety of medical therapy instead of stent implantation. For the current project, patients with ACS caused by a supply-demand mismatch were excluded. Since the objective of this study was to diagnose plaque erosion, patients with ACS caused by uncommon pathologies such as calcified nodule, spontaneous coronary dissection, or coronary spasm were also excluded. The patient selection process is summarized in FIG. 6. The diagnosis of ACS, which included ST-segment elevation myocardial infarction (STEMI) and non-ST-segment elevation acute coronary syndromes (NSTE-ACS), was made according to the current American Heart Association (AHA)/American College of Cardiology (ACC) guidelines. Demographic, clinical, and angiographic data were collected at each participating site and the anonymized data were sent to Massachusetts General Hospital (Boston, MA, USA).

Image Acquisition and Data Labeling

Figure 7:
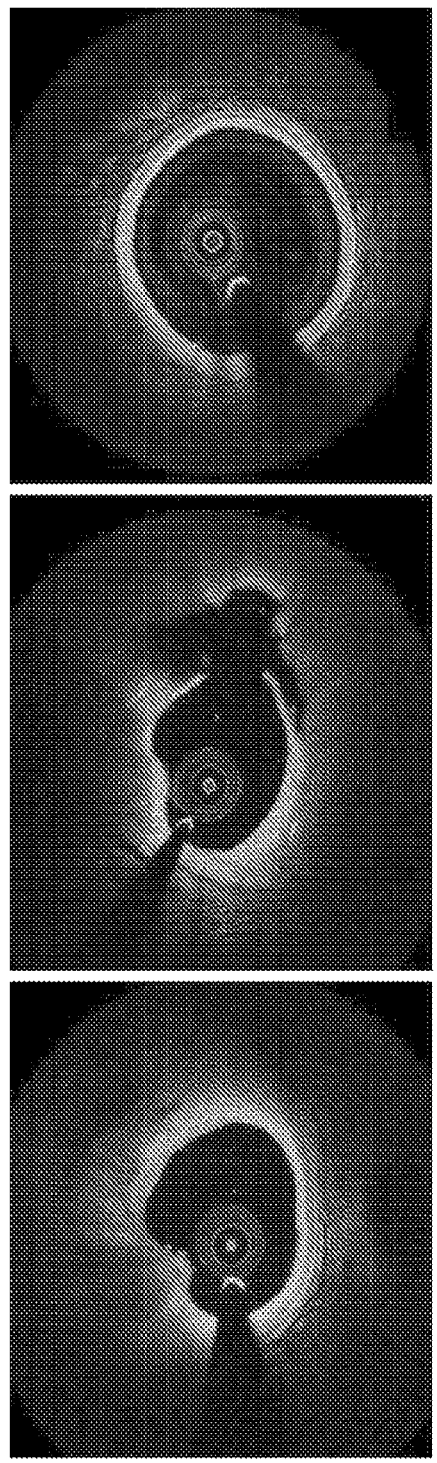
FIG. 7 shows representative Optical Coherence Tomography (OCT) image classes for "plaque erosion," "plaque rupture," and a catch-all category of "others." Representative images for each label are shown. Although the aim of the deep learning model is to diagnose "plaque erosion," the model was trained to also diagnose "plaque rupture" for comparison. Since the automated detection of plaque erosion during an OCT pullback is preferred, OCT images also contained sections with normal vessel segment, non-culprit plaque, different types of artifact, and views of guiding catheter; such non-significant images were grouped as "other."

The coronary segment that includes the ACS culprit lesion was assessed at 0.2-mm intervals using a frequency-domain (C7/C8, OCT Intravascular Imaging System, St. Jude Medical, St. Paul, Minnesota) OCT system and a 2.7-Fr OCT imaging catheter (Dragonfly, St. Jude Medical, St. Paul, Minnesota). OCT images were acquired before any percutaneous coronary intervention (PCI) procedures, with the exception of aspiration thrombectomy, which was allowed for occlusive thrombus. The median number of cross-sectional OCT images per patient was 217. OCT images were analyzed at the core laboratory at Massachusetts General Hospital. Labeling for all OCT images was done by two experienced investigators (M. A and A. N) who were blinded to patients' data, using an offline review workstation (St. Jude Medical, St. Paul, Minnesota). When there was discordance between the investigators, a consensus reading was obtained. A diagnosis of plaque erosion or plaque rupture was made based on previously established criteria. Labeling of cross-sectional OCT images in the training, validation, and external testing data sets was done frame-by-frame. Since the automated detection of plaque erosion or plaque rupture in an OCT pullback is preferred, sections with normal vessel segment, non-culprit plaque, different types of artifact, and guiding catheter were also included. We grouped such non-significant images as "other", and a label for each OCT image was assigned into one of the three groups: plaque rupture, plaque erosion, or other. Excellent intraobserver and interobserver agreement was noted in the classification of plaque erosion (kappa, 0.923 and 0.899, respectively) and plaque rupture (kappa, 0.924 and 0.923, respectively). Representative images of each label are shown in FIG. 7.

Anonymized OCT images in DICOM (digital imaging and communications in medicine) format and their corresponding labels were transferred to the Bio Imaging, Signal Processing, and Learning laboratory (BISPL) at Korea Advanced Institute of Science and Technology (KAIST), South Korea for the development and validation of the deep learning model.

Statistical Analysis

Continuous variables with a normal distribution were expressed as mean±standard deviation (SD), while the median (interquartile range) was used to summarize non-normally distributed variables. Normally distributed variables were compared using the Student's t-test and non-normally distributed variables were compared using the Mann-Whitney U test. Categorical data were expressed as absolute frequencies and percentages, and compared using the Chi-square test or Fisher exact test, as appropriate.

To evaluate the classification performance of the model, we adopted a one-versus-rest strategy to calculate the area under the receiver-operating-characteristic curve (AUC) for each of the three labels and averaged to estimate the overall AUC. Likewise, sensitivities, specificities and accuracies were calculated for each label as well as for overall performance metrics. The bootstrapping method was used to estimate the two-sided 95% confidence intervals (CIs) to summarize the sample variability. All analyses were performed using R software version 3.6.2 (R Foundation for Statistical Computing, Vienna, Austria) and Python library scikit-learn version 0.23.2.

The training and validation dataset included a total of 237,021 cross-sectional OCT images from 581 patients, while a total of 65,394 images from 292 patients were used to externally test the performance of the DL model. Detailed patient and lesion characteristics are shown in Table 7. Patients in the external testing data set were younger and more frequently presenting with STEMI. In the training and validation data set, 206 (43.2%) patients had plaque erosion and 330 (56.8%) patients plaque rupture. In the external testing data set, 86 (29.5%) patients had plaque erosion and 251 (70.5%) patients plaque rupture.

TABLE 7

Patient and Lesion Characteristics

|  | Total | Training & Validation | External Testing |
|---|---|---|---|
| Number of patients | 873 | 581 | 292 |
| Demographic data |  |  |  |
| Age, years | 61.9 ± 12.1 | 64.4 ± 12.2 | 56.9 ± 10.4 |
| Male | 686 (78.6) | 464 (79.9) | 222 (76.0) |

TABLE 7-continued

Patient and Lesion Characteristics

|  | Total | Training & Validation | External Testing |
|---|---|---|---|
| BMI, kg/m$^2$ | 25.1 ± 3.6 | 25.0 ± 4.1 | 25.2 ± 2.7 |
| Hypertension | 492 (56.4) | 358 (61.6) | 134 (45.9) |
| Hyperlipidemia | 456 (52.2) | 437 (75.2) | 19 (6.5) |
| Diabetes mellitus | 254 (29.1) | 187 (32.2) | 67 (22.9) |
| Current smoking | 435 (49.8) | 231 (39.8) | 204 (69.9) |
| Renal insufficiency | 114 (13.1) | 106 (18.2) | 8 (2.7) |
| Previous MI | 42 (4.8) | 34 (5.9) | 8 (2.7) |
| Previous PCI | 46 (5.3) | 41 (7.1) | 5 (1.7) |
| Previous CABG | 3 (0.3) | 1 (0.2) | 2 (0.7) |
| Clinical presentation |  |  |  |
| STEMI | 653 (74.8) | 366 (63.0) | 287 (98.3) |
| NSTE-ACS | 220 (25.2) | 215 (37.0) | 5 (1.7) |
| Laboratory data |  |  |  |
| Total cholesterol, mg/dl | 189.5 ± 41.2 | 192.5 ± 40.7 | 183.2 ± 41.5 |
| LDL-C, mg/dl | 127.2 ± 40.4 | 128.5 ± 41.4 | 124.2 ± 37.8 |
| HDL-C, mg/dl | 46.5 ± 11.5 | 46.2 ± 11.6 | 47.4 ± 11.3 |
| Triglycerides, mg/dl (Range) | 110.8 (67.0-161.3) | 100.0 (58.0-150.0) | 136.4 (96.6-185.6) |
| HbA1c, % | 6.4 ± 1.3 | 6.3 ± 1.3 | 6.5 ± 1.5 |
| Creatinine, mg/dl | 0.87 ± 0.48 | 0.93 ± 0.57 | 0.75 ± 0.19 |
| Hs-CRP, mg/dl (Range) | 0.34 (0.10-4.76) | 0.10 (0.05-0.30) | 7.15 (3.24-12.48) |
| Peak CK, IU/l (Range) | 1517.0 (413.8-2995.3) | 1136.0 (270.0-2917.3) | 1997.5 (1083.3-3079.5) |
| Peak CK-MB, IU/l (Range) | 160.9 (47.8-296.6) | 132.3 (32.0-291.0) | 182.3 (86.7-313.0) |
| LVEF, % | 56.1 ± 10.2 | 55.7 ± 11.4 | 56.8 ± 8.0 |
| Angiographic data |  |  |  |
| Infarct-related artery |  |  |  |
| RCA | 320 (36.7) | 207 (35.6) | 113 (38.7) |
| LAD | 458 (52.5) | 305 (52.5) | 153 (52.4) |
| LCx | 95 (10.9) | 69 (11.9) | 26 (8.9) |
| Minimum lumen diameter, mm | 0.64 ± 0.63 | 0.42 ± 0.57 | 1.08 ± 0.49 |
| Reference vessel diameter, mm | 3.02 ± 0.68 | 2.88 ± 0.70 | 3.31 ± 0.52 |
| Lesion length, mm | 15.9 ± 7.5 | 15.5 ± 6.9 | 16.7 ± 8.6 |
| Diameter stenosis, % | 79.7 ± 18.4 | 86.1 ± 17.1 | 67.2 ± 14.0 |
| OCT findings |  |  |  |
| Pathobiology |  |  |  |
| Plaque erosion | 337 (38.6) | 251 (43.2) | 86 (29.5) |
| Plaque rupture | 536 (61.4) | 330 (56.8) | 206 (70.5) |
| Lipid-rich plaque | 647 (74.1) | 389 (67.0) | 258 (88.4) |
| Thin-cap fibroatheroma | 383 (43.9) | 199 (34.3) | 184 (63.0) |
| Macrophage | 629 (72.1) | 401 (69.0) | 228 (78.1) |
| Cholesterol crystal | 222 (25.4) | 138 (23.8) | 84 (28.8) |
| Calcification | 296 (33.9) | 236 (40.6) | 60 (20.5) |

Notes:
Values shown are n (%), mean ± standard deviation, or median (25th-75th percentile). BMI indicates body mass index; CABG, coronary artery bypass graft; CK, creatine kinase; CK-MB, creatine kinase-MB; HbA1c, hemoglobin A1c; HDL-C, high-density lipoprotein-cholesterol; Hs-CRP, high-sensitivity C-reactive protein; LAD, left anterior descending artery; LCx, left circumflex artery; LDL-C, low-density lipoprotein-cholesterol; LVEF, left ventricular ejection fraction; MI, myocardial infarction; NSTE-ACS, non-ST-segment elevation acute coronary syndrome; PCI, percutaneous coronary intervention; RCA, right coronary artery; STEMI, STsegment elevation myocardial infarction.

Table 8 summarizes the classification performance of the DL model at the frame-level in the validation and the external testing data sets. In the five-fold cross validation, the DL model diagnosed three labels with an overall AUC of 0.964 (95% CI, 0.963-0.964), sensitivity of 85.5% (95% CI, 85.3-85.6), specificity of 93.8% (95% CI, 93.8-93.9), and accuracy of 92.6% (95% CI, 92.5-92.6). In detail, the model showed an AUC, sensitivity, specificity and accuracy of 0.947 (95% CI, 0.947-0.948), 81.7% (95% CI, 81.4-82.0), 92.5% (95% CI, 92.4-92.5) and 92.0% (95% CI, 92.0-92.1) for plaque erosion, and 0.979 (95% CI, 0.979-0.980), 85.4% (95% CI, 85.1-85.6), 96.5% (95% CI, 96.5-96.6) and 96.1% (95% CI, 96.1-96.1) for plaque rupture. In the external testing data set, the overall AUC, sensitivity, specificity and accuracy were 0.959 (95% CI, 0.959-0.959), 86.1% (95% CI, 86.1-86.2), 93.0% (95% CI, 93.0-93.0) and 91.1% (95% CI, 91.1-91.1). In detail, the model had an AUC, sensitivity, specificity and accuracy of 0.963 (95% CI, 0.962-0.963), 89.9% (95% CI, 89.7-90.0), 91.1% (95% CI, 91.1-91.2) and 91.1% (95% CI, 91.0-91.1) for plaque erosion, and 0.960 (95% CI, 0.959-0.960), 81.8% (95% CI, 81.6-81.9), 95.6% (95% CI, 95.6-95.6) and 94.8% (95% CI, 94.8-94.9) for plaque rupture.

TABLE 8

Diagnostic Performance of the Deep Learning Model on the Primary Validation Data Set and External Testing Data Set at the Frame-Level

| | Number of Images | AUC (95% CI) | Sensitivity (%) (95% CI) | Specificity (%) (95% CI) | Accuracy (%) (95% CI) |
|---|---|---|---|---|---|
| Primary validation data set | | | | | |
| Overall | 237021 | 0.964 | 85.5 | 93.8 | 92.6 |
| (Range) | | (0.963-0.964) | (85.3-85.6) | (93.8-93.9) | (92.5-92.6) |
| Plaque erosion | 9700 | 0.947 | 81.7 | 92.5 | 92.0 |
| (Range) | | (0.947-0.948) | (81.4-82.0) | (92.4-92.5) | (92.0-92.1) |
| Plaque rupture | 8909 | 0.979 | 85.4 | 96.5 | 96.1 |
| (Range) | | (0.979-0.980) | (85.1-85.6) | (96.5-96.6) | (96.1-96.1) |
| Other | 218412 | 0.964 | 89.3) | 92.4 | 89.6 |
| (Range) | | (0.964-0.965) | (89.3-89.4) | (92.3-92.5) | (89.5-89.6) |
| External testing data set | | | | | |
| Overall | 65394 | 0.959 | 86.1 | 93.0 | 91.1 |
| (Range) | | (0.959-0.959) | (86.1-86.2) | (93.0-93.0) | (91.1-91.1) |
| Plaque erosion | 3488 | 0.963 | 89.9 | 91.1 | 91.1 |
| (Range) | | (0.962-0.963) | (89.7-90.0) | (91.1-91.2) | (91.0-91.1) |
| Plaque rupture | 3690 | 0.960 | 81.8 | 95.6 | 94.8 |
| (Range) | | (0.959-0.960) | (81.6-81.9) | (95.6-95.6) | (94.8-94.9) |
| Other | 58216 | 0.955 | 86.7 | 92.3 | 87.3 |
| (Range) | | (0.955-0.955) | (86.7-86.8) | (92.2-92.3) | (87.3-87.4) |

Notes:
AUC, area under the curve; CI, confidence interval.

We also evaluated the diagnostic performance of DL model at the patient-level (Table 9). In the five-fold cross validation, the DL model showed overall AUC of 0.906 (95% CI, 0.905-0.908), sensitivity of 82.2% (95% CI, 82.0-82.4), specificity of 85.3% (95% CI, 85.1-85.5), and accuracy of 83.9% (95% CI, 83.7-84.1) for the three labels. Specifically, AUC, sensitivity, specificity and accuracy were 0.900 (95% CI, 0.898-0.901), 80.4% (95% CI, 80.1-80.8), 85.8% (95% CI, 85.6-86.1) and 83.5% (95% CI, 83.3-83.7) for plaque erosion, and 0.913 (95% CI, 0.912-0.915), 84.0% (95% CI, 83.7-84.3), 84.8% (95% CI, 84.5-85.2), and 84.3% (95% CI, 84.1-84.6) for plaque rupture. In the external testing data set, the model had an overall AUC, sensitivity, specificity and accuracy of 0.907 (95% CI, 0.906-0.908), 85.0% (95% CI, 84.9-85.2), 88.7% (95% CI, 88.6-88.8) and 84.6% (95% CI, 84.4-84.7) for the three labels, with an AUC, sensitivity, specificity and accuracy of 0.901 (95% CI, 0.900-0.902), 89.6% (95% CI, 89.4-89.8), 82.0% (95% CI, 81.9-82.2) and 84.2% (95% CI, 84.1-84.4) for plaque erosion, and 0.912 (95% CI, 0.911-0.913), 80.5% (95% CI, 80.3-80.7), 95.4% (95% CI, 95.3-95.5) and 84.9% (95% CI, 84.7-85.0) for plaque rupture.

TABLE 9

Diagnostic Performance of the Deep Learning Model on the Primary Validation Data Set and External Testing Data Set at the Patient-Level

| | Number of Images | AUC (95% CI) | Sensitivity (%) (95% CI) | Specificity (%) (95% CI) | Accuracy (%) (95% CI) |
|---|---|---|---|---|---|
| Primary validation data set | | | | | |
| Overall | 581 | 0.906 | 82.2 | 85.3 | 83.9 |
| (Range) | | (0.905-0.908) | (82.0-82.4) | (85.1-85.5) | (83.7-84.1) |
| Plaque erosion | 251 | 0.900 | 80.4 | 85.8 | 83.5 |
| (Range) | | (0.898-0.901) | (80.1-80.8) | (85.6-86.1) | (83.3-83.7) |
| Plaque rupture | 330 | 0.913 | 84.0 | 84.8 | 84.3 |
| (Range) | | (0.912-0.915) | (83.7-84.3) | (84.5-85.2) | (84.1-84.6) |
| External testing data set | | | | | |
| Overall | 292 | 0.907 | 85.0 | 88.7 | 84.6 |
| (Range) | | (0.906-0.908) | (84.9-85.2) | (88.6-88.8) | (84.4-84.7) |
| Plaque erosion | 86 | 0.901 | 89.6 | 82.0 | 84.2 |
| (Range) | | (0.900-0.902) | (89.4-89.8) | (81.9-82.2) | (84.1-84.4) |
| Plaque rupture | 206 | 0.912 | 80.5 | 95.4 | 84.9 |
| (Range) | | (0.911-0.913) | (80.3-80.7) | (95.3-95.5) | (84.7-85.0) |

Notes:
AUC, area under the curve; CI, confidence interval.

The number of false-positive, false-negative, true-positive and true-negative results for each model are presented in FIG. 12. At the frame-level, the false-positive and false-negative rates were 8.9% and 10.2% for plaque erosion and 4.4% and 18.2% for plaque rupture. At the patient-level, the false-positive and false-negative rates were 18.0% and 10.5% for plaque erosion and 4.7% and 19.4% for plaque rupture, respectively.

Definition of the Training, Validation, and External Testing Data Sets

In deep learning, data are generally divided into two major data sets: "training" and "testing" data sets. These data sets are independent of each other and do not overlap. The primary training data set is also referred to as the "training and validation" data set, as it can be further split into "training" and "validation" data sets. The training data set is a data set used to train the weights of the network. The deep neural network generally receives subsets called "batch" from the training data set and optimizes its weights via backpropagation. In general, the training is performed by repeating this optimization process until the network finds the optimal weight parameters. As the deep neural network can potentially overfit the training data during the training, the validation data set is used for this account to determine the hyperparameter such as the proper stopping point to prevent overfitting. The external testing data set is a set used to evaluate the performance of the deep neural network trained and tuned with primary training and validation data sets, which contain data obtained at a different institution, usually with different devices and clinical settings. This will ensure how well the network will be generalized in a different data set, which is related to the clinical applicability of the system. In the current study, we used the Identification of Predictors for Coronary Plaque Erosion in Patients with Acute Coronary Syndrome study (the Predictor study), which is from 8 institutions in 4 countries (Table 8), as the primary training and validation data set, and the Effective Anti-Thrombotic Therapy Without Stenting: Intravascular Optical Coherence Tomography—Based Management in Plaque Erosion study (the EROSION study) data, which is from a single institution, as the external testing data set.

Development of the Deep Learning Model

A convolution neural network (CNN) is a type of deep neural network devised to process structured array data such as images. CNNs have been widely used because of their outstanding performance in computer vision and they have recorded state-of-the-art performance in many tasks such as classification, object detection, and segmentation. In particular, CNNs are specialized to extract useful patterns called features from images thanks to the convolution operation, which is the driving force that makes CNNs strong in various visual applications. CNNs require little or no pre-processing and in many cases can be used directly for raw images. However, as CNN-based classification networks were originally developed to deal with 2-dimensional (2D) images in computer vision, they are more suitable for 2D medical images like X-ray or fundus ophthalmoscopy rather than volumetric image data such as magnetic resonance imaging (MRI) or computed tomography (CT). Although some variant CNNs have been proposed to deal with volumetric image data, many limitations still exist such as the use of excessive memory to handle the data volume, the lack of a method to integrate the information from distant frames, and so forth.

The Transformer is a recently-developed deep neural network architecture proposed for natural language processing (NLP) where it is required to handle long sequence data like sentences. Unlike previous models for NLP such as recurrent neural network or long-short-term-memory, Transformer offers a different way to handle the sequenced data, not by processing them one-by-one, but by treating the entire sequence data all at once. It uses a self-attention mechanism to estimate the weights for each component of the sequence to make a prediction, and transforms a given embedding vector to a transformed embedding vector that contains the information of the entire sequence after applying the self-attention weights. Though initially designed for NLP, the concept of utilizing information of the entire sequence with a self-attention mechanism can also be applied to image data with sequence or volume. Therefore, we devised an algorithm specializing in volumetric image data that enables the integration of the information from the entire sequence by conjugating CNN and Transformer.

A detailed diagram of the proposed Image Sequence Transformer is provided in FIG. 8. To obtain the embedding similar to the word embedding of the original Transformer, we used the CNN backbone to extract image features. In detail, the input intravascular OCT images were first resized to 224×224 and fed into the CNN backbone to make image features with 2048 dimensions. The resulting image features were then used as input of the Transformer-encoder, which was followed by a linear classifier. We also tailored the Transformer-encoder layers to make them more suitable for the structure of OCT image data. As suggested in FIG. 11, the experimental results had revealed that the Transformer-encoder layer with a residual path made a self-attention mechanism mainly focused on globally important frames (which contain target lesions) and the layer without residual path focused on adjacent frames which impose attention to the frame with locally important features. Therefore, we proposed a Transformer architecture with two layers, one with a residual path and the other without a residual path, to utilize both global and local attention. Since it was observed from experiments that the number of attention heads had little effect on model performance, we used one attention head per each layer for better interpretability.

For training, we randomly cut off the OCT frames of a single patient which contain 205 to 540 frames into smaller blocks (180 frames) to increase data variability while maintaining the same input length. To fully utilize the benefit from the Transformer architecture, we adopted the pre-training and fine-tuning methods introduced in Bidirectional Encoder Representations from Transformers (BERT). The details of our training scheme are described in FIG. 10. First, we trained the CNN backbone (ResNet-50 initialized with ImageNet pre-trained weights), which can also be referred to as the conventional CNN model, with a standard supervised learning approach. The trained weights were then transferred to the CNN backbone part of the Image Sequence Transformer. Image Sequence Transformer learned to incorporate the sequenced structures of image embedding by a self-supervised, contrastive learning method with various augmentations (rotation, scaling, shearing, flipping, cutting out and shrinking sequences) inspired by the prior work and fine-tuned with standard supervised learning for the downstream task to classify three labels: plaque rupture, plaque erosion, and others. The details about the hyperparameters used for each training phase are provided in Table 7.

TABLE 7

Summary of Hyperparameters of the Deep Learning Model

| Hyperparameters | Value |
|---|---|
| Training of CNN backbone | |
| Input image size | 224 × 224 |
| Batch size | 360 |
| Learning rate | 0.000002 |
| Learning rate scheduler | OneCycleLR |
| Optimizer | AdamW |
| Epochs | 20 |
| Image feature dimension | 2048 |
| Dropout ratio | 0.1 |
| Weight decay coefficient | 0.1 |
| Self-supervised pre-training of the deep learning model | |
| Input image size | 224 × 224 |
| Batch size | 2 |
| Sequence length | 180 |
| Transformer encoder layer number | 2 |
| Attention head number | 1 |
| Learning rate for CNN backbone | 0.000002 |
| Learning rate for Transformer | 0.00002 |
| Learning rate scheduler | OneCycleLR |
| Optimizer | AdamW |
| Epochs | 30 |
| Image feature dimension | 2048 |
| Dropout ratio | 0.1 |
| Weight decay coefficient | 0.1 |
| Gradient clipping | 0.5 |
| Supervised fine-tuning of the deep learning model | |
| Input image size | 224 × 224 |
| Batch size | 5 |
| Sequence length | 180 |
| Transformer encoder layer number | 2 |
| Attention head number | 1 |
| Learning rate for CNN backbone | 0.0000008 |
| Learning rate for Transformer | 0.000008 |
| Learning rate scheduler | OneCycleLR |
| Optimizer | AdamW |
| Epochs | 30 |
| Image feature dimension | 2048 |
| Dropout ratio | 0.1 |
| Weight decay coefficient | 0.1 |
| Gradient clipping | 0.5 |

Notes:
CNN indicates convolutional neural network; OneCycleLR, one-cycle learning rate.

TABLE 8

Summary of the Countries and Institutions of the Predictor Study

| Participating sites | Country | Number of included patients |
|---|---|---|
| Nara Medical University Hospital | Japan | 150 |
| Nippon Medical Chiba Hokusoh Hospital | Japan | 109 |
| Hirosaki University Hospital | Japan | 88 |
| Mass. General Hospital OCT Registry* | US | 72 |
| The Chinese University of Hong Kong | Hong Kong | 61 |
| Tsuchiura Kyodo General Hospital | Japan | 59 |
| Kitasato University Hospital | Japan | 22 |
| University Hospitals Leuven | Belgium | 20 |
| Total | | 581 |

Notes:
OCT, Optical Coherence Tomography; Mass. General Hospital OCT Registry collected patients from 12 sites from 6 countries.

As the dataset contains different numbers of images for each label (9,700 frames for plaque erosion, 8,909 frames for plaque rupture, and 218,412 frames for other), we adjusted weight values for each class to mitigate the problem of an imbalanced data sample between the classes during the training and validation. The weighted cross-entropy loss function was defined as below.

$$\text{Loss} = -\Sigma \text{weight}[\text{class}] y[\text{class}] \log(p[\text{class}])$$

where weight[class] is the class weight, y[class] is the label for the class, and p[class] is the predicted probability for the class. We calculated the weight value for each class to be inversely proportional to the number of images for each label. By this method, more weights were given to labels with a small number of images, while fewer weights were given to a label with a large number of images to affect the network parameters with a similar amount during the training process. With the concept of the Bayesian inference, we also applied additional weights for each label to satisfy the pre-defined sensitivity (>0.80) for each label, defined as below.

$$P \text{ weighted}[\text{class}] = \text{weight}[\text{class}] p[\text{class}] / \Sigma \text{weight}[\text{class}] p[\text{class}]$$

where P weighted[class] stand for the weighted probability for the class, weight[class] is the class weight, and p[class] is the predicted probability for the class by the model.

In addition, we adapted our Image Sequence Transformer for diagnosis of plaque erosion at the patient-level. The modified version of Image Sequence Transformer for patient-level diagnosis is illustrated in FIGS. 7, 9, and 12. We transferred the weights of Image Sequence Transformer trained for frame-level diagnosis and added an additional Transformer layer after prepending a learnable [cls] token to embed the context of the entire sequence.

The benefit of our Image Sequence Transformer was prominent when it was compared with the conventional CNN model. Compared with the conventional CNN model showing suboptimal performance for diagnosis of plaque erosion (Table 9), the Image Sequence Transformer showed substantial improvement in performance (Table 10 and FIG. 13). In the five-fold cross-validation data set, the Image Sequence Transformer showed better performance compared to the conventional CNN model with an 0.051 improvement in AUC for diagnosis of plaque erosion. In the external testing data set, the Image Sequence Transformer consistently showed more prominent increases in performance with an increase of 0.111 in AUC for diagnosis of plaque erosion, while both models were able to diagnose plaque rupture accurately since it presents distinct structural deformation which is relatively easy to discriminate.

TABLE 9

Classification Performance of the Conventional CNN Model on the Primary Validation Data Set and External Testing Data Set at the Frame-level

| | Number of Images | AUC (95% CI) | Sensitivity (%) (95% CI) | Specificity (%) (95% CI) | Accuracy (%) (95% CI) |
|---|---|---|---|---|---|
| Primary validation data set | | | | | |
| Overall | 237021 | 0.938 (0.937-0.938) | 77.5 (77.4-77.6) | 90.9 (90.8-90.9) | 86.0 (85.9-86.0) |
| Plaque Erosion | 9700 | 0.896 (0.896-0.897) | 78.9 (78.7-79.1) | 82.6 (82.5-82.6) | 82.4 (82.3-82.5) |
| Plaque Rupture | 8909 | 0.970 (0.970-0.970) | 74.6 (74.3-74.8) | 96.0 (96.0-96.0) | 95.2 (95.2-95.2) |
| Other | 218412 | 0.947 (0.946-0.947) | 79.2 (79.1-79.3) | 94.0 (93.9-94.1) | 80.3 (80.2-80.4) |
| External testing data set | | | | | |
| Overall | 65394 | 0.911 (0.910-0.911) | 75.1 (75.0-75.1) | 88.2 (88.2-88.3) | 83.3 (83.2-83.3) |
| Plaque Erosion | 3488 | 0.852 (0.851-0.853) | 73.5 (73.3-73.6) | 79.3 (79.3-79.4) | 79.0 (79.0-79.1) |
| Plaque Rupture | 3690 | 0.963 (0.963-0.964) | 76.9 (76.7-77.0) | 95.3 (95.3-95.3) | 94.3 (94.2-94.3) |
| Other | 58216 | 0.916 (0.916-0.917) | 74.9 (74.8-74.9) | 90.0 (90.0-90.1) | 76.5 (76.5-76.6) |

Notes:
AUC indicates area under the curve; CI, confidence interval; CNN, convolutional neural network.

TABLE 10

Performance Increase of the Disclosed Model over the Convention CNN Model at the Frame-level

| | AUC Increase (%) | Sensitivity Increase (%) | Specificity Increase (%) | Accuracy Increase (%) |
|---|---|---|---|---|
| Primary validation data set | | | | |
| Overall | 0.026 (0.964 vs. 0.938) | 7.9 (85.5 vs. 77.5) | 3.0 (93.8 vs. 90.9) | 6.6 (92.6 vs. 86.0) |
| Plaque erosion | 0.051 (0.947 vs. 0.896) | 2.8 (81.7 vs. 78.9) | 9.9 (92.5 vs. 82.6) | 9.6 (92.0 vs. 82.4) |
| Plaque rupture | 0.009 (0.979 vs. 0.970) | 10.8 (85.4 vs. 74.6) | 0.5 (96.5 vs. 96.0) | 0.9 (96.1 vs. 95.2) |
| Other | 0.018 (0.964 vs. 0.947) | 10.2 (89.3 vs. 79.2) | −1.6 (92.4 vs. 94.0) | 9.2 (89.6 vs. 80.3) |
| External testing data set | | | | |
| Overall | 0.049 (0.959 vs. 0.911) | 11.1 (86.1 vs. 75.1) | 4.8 (93.0 vs. 88.2) | 7.8 (91.1 vs. 83.3) |
| Plaque erosion | 0.111 (0.963 vs. 0.852) | 16.4 (89.9 vs. 73.5) | 11.8 (91.1 vs. 79.3) | 12.1 (91.1 vs. 79.0) |
| Plaque rupture | −0.004 (0.960 vs. 0.963) | 4.9 (81.8 vs. 76.9) | 0.3 (95.6 vs. 95.3) | 0.6 (94.8 vs. 94.3) |
| Other | 0.039 (0.955 vs. 0.916) | 11.9 (86.7 vs. 74.9) | 2.3 (92.3 vs. 90.0) | 10.8 (87.3 vs. 76.5) |

Notes:
Increases compare the disclosed model relative to the CNN model;
CNN, convolutional neural network;
AUC, area under the curve Five-Fold Cross-Validation and Hyperparameter Tuning In the current study, we used the five-fold cross-validation method consisting of two steps. First, the Predictor study data were split into the primary training and validation data set with a 4:1 ratio to construct five-fold cross-validation data sets that do not overlap. We ran five-fold cross-validation to train five separate models to evaluate the performances and averaged them to get the overall performance over those models. The average performance of five models was used for hyperparameter tuning by changing the hyperparameters and evaluating the average performance repeatedly until getting the best performance. The hyperparameters tuned with this method include learning rate (range from 0.000001 to 0.01), learning rate schedule (constant, step decay, exponential decay, one-cycle learning rate policy), optimizer (SGD, Adam, AdamW), batch size (range from 1 to 8), total training epoch (range from 10 to 100), and gradient clipping (no gradient clipping, 0.5, 1.0). Second, the primary training and validation data sets were integrated into the entire training data set, and a new network was re-trained with this entire training data set using the best hyperparameters obtained from the cross-validation process. This network was then used to evaluate the final performance of the model in the external testing data set (the EROSION study data).

Model Interpretability

To give the visual explanation about the prediction by the deep learning model, we visualized the attention of the network in two ways: the single-frame level and patient level visualization.

In order to visualize the attention at the single-frame level, the activation map was generated using Grad-CAM. Grad-CAM uses the gradient for classes to estimate the importance of spatial location in a feature map and provide an activation map that highlights the region to predict each label. We set the threshold as >0.80 to be considered the area of importance. As shown in the representative cases in FIG. 14, the target lesions were localized within the red-coded area (>normalized attention map value of 0.80) of network attention in the activation map generated by Grad-CAM.

Figure 15:
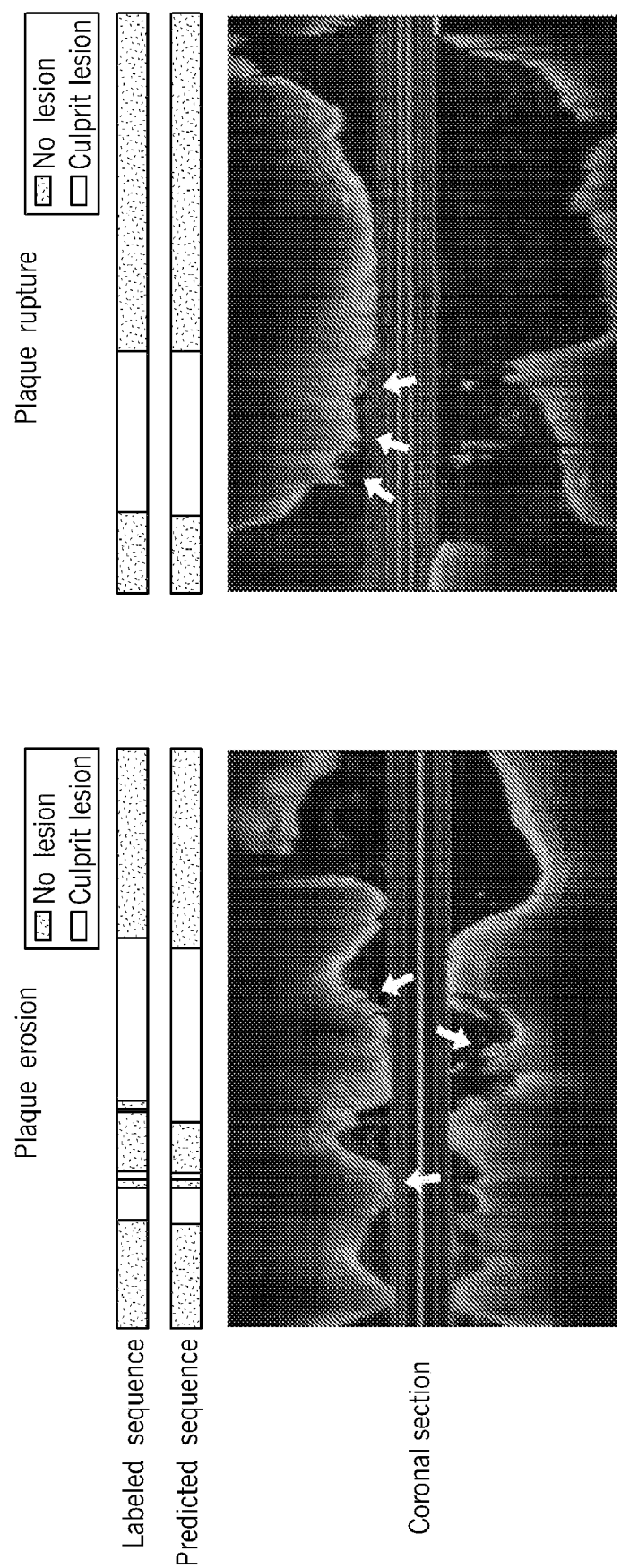
FIG. 15 shows visualization of culprit lesion identification at the sequence level for plaque erosion (left) and plaque rupture (right), where the disclosed model successfully identified 93.5% of culprit lesions for each patient on average. The white arrows in the images show the location of the target lesions.

An attention-based model such as Transformer gives the weight matrices for self-attention to see which frame is weighted more than others for each classification result. Therefore, we obtained the self-attention weight matrices in the second layer which has global attention across the whole frame of the patient as well as in the first layer which contains local attention nearby. The resulting self-attention matrices were then normalized and visualized in grayscale to show the attention of the network at the patient level. As depicted in FIG. 11, the frames that contain target culprit lesions were localized by the self-attention mechanism of the Image Sequence Transformer. The sequence level attention is another improvement over the conventional CNN. Even with the sequence level-attention alone, the Image Sequence Transformer successfully identified 93.5% of culprit lesions, which was not feasible using the conventional CNN that can provide only frame-level attention (FIG. 15).

Bootstrap Sampling for Confidence Interval Estimation

The bootstrapping method was used to estimate the 95% confidence intervals (CIs) of the performance metrics for classification, which include area under the receiver-operating characteristic curve, sensitivity, specificity and accuracy. In detail, we performed n-out-of-n bootstrapping with replacement. The bootstrap sampling was repeated 1000 times at the patient level, and the performance metrics were recorded for each time. Finally, we estimated a 95% CI from the distribution of recorded values.

Thus, a new DL model, dubbed Image Sequence Transformer, was developed to improve the diagnostic accuracy of plaque erosion by OCT using well-curated multi-center databases. Our main finding is that the new DL model, which resembles the interpretation process of OCT experts with the help of self-attention along the entire sequence, is able to accurately diagnose plaque erosion both at the frame-level and at the patient-level. The model diagnosed plaque erosion with a sensitivity of 89.9% and a specificity of 91.1% at the frame-level and 89.6% and 82.0% at the patient-level in the independent external testing data set.

Plaque erosion and plaque rupture are distinctly different entities. Plaque erosion is characterized by a plaque with an intact fibrous cap and preserved vascular integrity, whereas plaque rupture occurs at a lipid plaque with a necrotic core which is exposed to circulating blood following rupture of fibrous cap. Luminal thrombus in plaque erosion has been attributed to apoptosis or denudation of superficial endothelial cells and is typically rich in platelets. These unique features of plaque erosion indicate that thrombus removal and effective anti-thrombotic therapy without stent implantation may be sufficient to restore coronary artery patency and allow healing of the endothelial layer. A recent study reported that patients with ACS caused by plaque erosion might be stabilized by effective anti-thrombotic therapy without stent implantation, thereby abrogating early and late stent-related complications. However, one potential problem of this strategy is the difficulty of accurate diagnosis of plaque erosion. In addition, it may be difficult for interventional cardiologists to take enough time to focus on image interpretation during emergent PCI. In contrast, the deep learning model takes a few seconds to provide a diagnosis with high accuracy. Although it would require further study, the disclosed deep learning algorithm may identify patients with plaque erosion who could potentially benefit from conservative therapy.

Despite the success and rapid adaptation of deep learning in medical imaging, only a few studies have reported a diagnosis of specific OCT findings. It has been reported that a deep learning model can detect a specific plaque phenotype, thin-cap fibroatheroma (TCFA), but data was from a single-center without external validation, which may have resulted in overfitting to the included population. The validation of models using external data set is important particularly in medical imaging because inaccurate diagnoses may lead to the wrong therapy and expose patients to unnecessary risk. The current study has utilized data sets collected from two independent studies to develop and optimize the model, and to assess the performance of the model, respectively. Although there were differences in patient and lesion characteristics, the results were comparable between the two studies, showing superb generalization capability in totally different data sets reflecting its applicability in a real-world setting.

When OCT experts diagnose plaque erosion, they need to assess a set of images as a whole and not miss plaque rupture in the patient. Because of this complex recognition process, the conventional CNN-based DL model failed to show optimal performance for diagnosis of plaque erosion (Table 9). In contrast, our new DL model considers the entire sequences of OCT frames to identify target lesions including adjacent proximal and distal segments, emulating the recognition process of experienced readers who play OCT recordings back and forth to make an accurate diagnosis. As a result, the better performance of our DL model over the conventional CNN based model was more pronounced for the diagnosis of plaque erosion, which can be more challenging to diagnose, than for plaque rupture, which usually has obvious structural deformations (Table 10 and FIG. 13).

Figure 14:
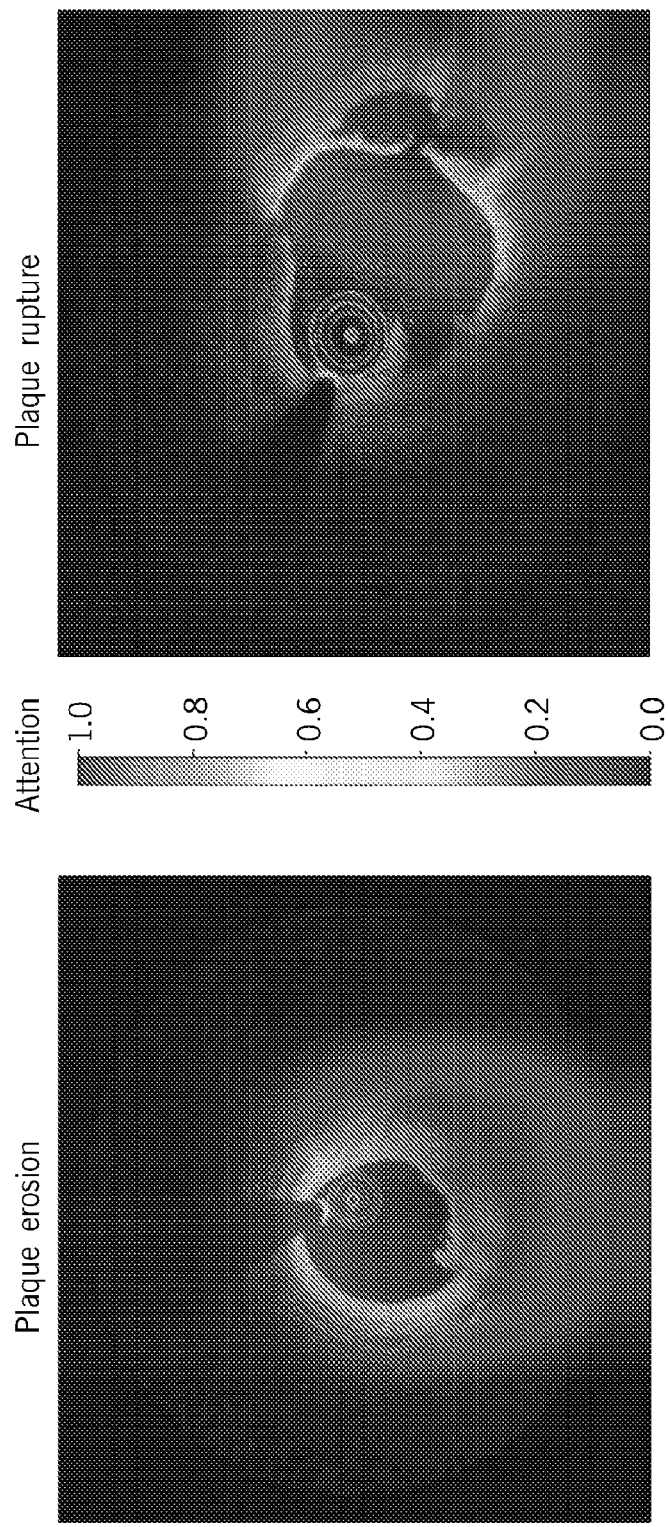
FIG. 14 shows visualization of frame-level attention, for plaque erosion (left) and plaque rupture (right), using Grad-CAM. The frame-level network attention was visualized for subjects in the external testing data set. At the frame level, the target lesions were localized within the red-coded area (>normalized attention map value of 0.80) in the activation map generated by gradient-weighted class activation mapping (Grad-CAM).

A key drawback of DL models may be the lack of interpretability. The features used by deep learning models to make a diagnosis are unknown. Identifying these features could be of importance because they might offer novel findings that could provide new therapeutic targets or allow for more certainty for clinicians who are trying to understand what drives the model's interpretation. To mitigate the drawback, we visualized the attention of our DL model (FIG. 11, FIG. 14, and FIG. 15). As illustrated in FIG. 14, the DL model localized the target lesion within a frame, which is consistent with the area of importance for OCT experts diagnosing plaque erosion. Although further studies are required, frame-level interpretations and lesion locations obtained from our model can be annotated on real-time OCT images and provide an accurate diagnosis to cardiologists.

Our study has several limitations. First, interpretation by experienced readers was used as the ground truth. This approach was taken, as it was impossible to use histology validation for the development of a new deep learning model using intracoronary imaging. This approach has been widely used in developing DL models in medical imaging, when validation with histologic examination is not available. Second, the decision to perform OCT was left at the discretion of each operator, although OCT was routinely used at the participating institutions. Patients with poor OCT image quality were excluded. Therefore, selection bias cannot be excluded. Third, since we focused on the diagnosis of plaque erosion and plaque rupture for comparison, less common ACS pathologies such as calcified nodule, spontaneous coronary dissection, or intraplaque hemorrhage were not included. Fourth, although this is the largest study so far, the number of subjects was still not sufficient to generalize the results of the current study.

Figure 16:
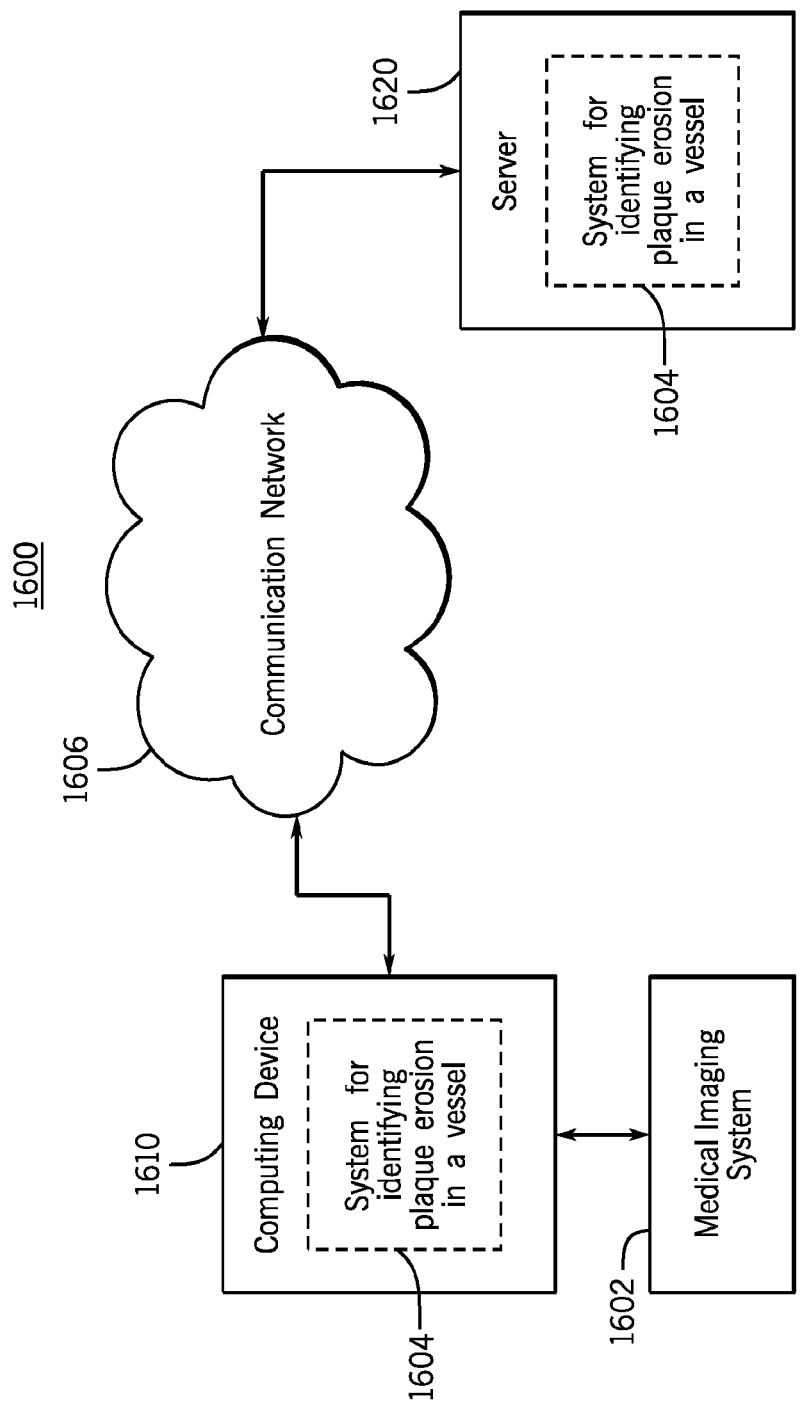
FIG. 16 shows an example of a system for identifying plaque erosion in a vessel in accordance with some embodiments of the disclosed subject matter.

Turning to FIG. 16, an example 1600 of a system (e.g. a data collection and processing system) for identifying plaque erosion in a vessel is shown in accordance with some embodiments of the disclosed subject matter. In some embodiments, a computing device 1610 can execute at least a portion of a system for identifying plaque erosion in a vessel 1604 and provide control signals to one or more optical components associated with a medical imaging system 1602, for example an interferometric imaging system such as OCT. Additionally or alternatively, in some embodiments, computing device 1610 can communicate information regarding the control signals to or from a server 1620 over a communication network 1606, which can execute at least a portion of system for identifying plaque erosion in a vessel 1604. In some such embodiments, server 1620 can return information to computing device 1610 (and/or any other suitable computing device) relating to the control signals for system for identifying plaque erosion in a vessel 1604. This information may be transmitted and/or presented to a user (e.g. a researcher, an operator, a clinician, etc.) and/or may be stored (e.g. as part of a research database or a medical record associated with a subject).

In some embodiments, computing device 1610 and/or server 1620 can be any suitable computing device or combination of devices, such as a desktop computer, a laptop computer, a smartphone, a tablet computer, a wearable computer, a server computer, a virtual machine being executed by a physical computing device, etc. As described herein, system for identifying plaque erosion in a vessel 1804 can present information about the control signals to a user (e.g., researcher and/or physician). In some embodiments, medical imaging system 1602 may include a probe and other optical components for collecting data from a subject.

In some embodiments, communication network 1606 can be any suitable communication network or combination of communication networks. For example, communication network 1606 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, WiMAX, etc.), a wired network, etc. In some embodiments, communication network 1606 can be a local area network, a wide area network, a public network (e.g., the Internet), a private or semi-private network (e.g., a corporate or university intranet), any other suitable type of network, or any suitable combination of networks. Communications links shown in FIG. 16 can each be any suitable communications link or combination of communications links, such as wired links, fiber optic links, Wi-Fi links, Bluetooth links, cellular links, etc.

Figure 17:
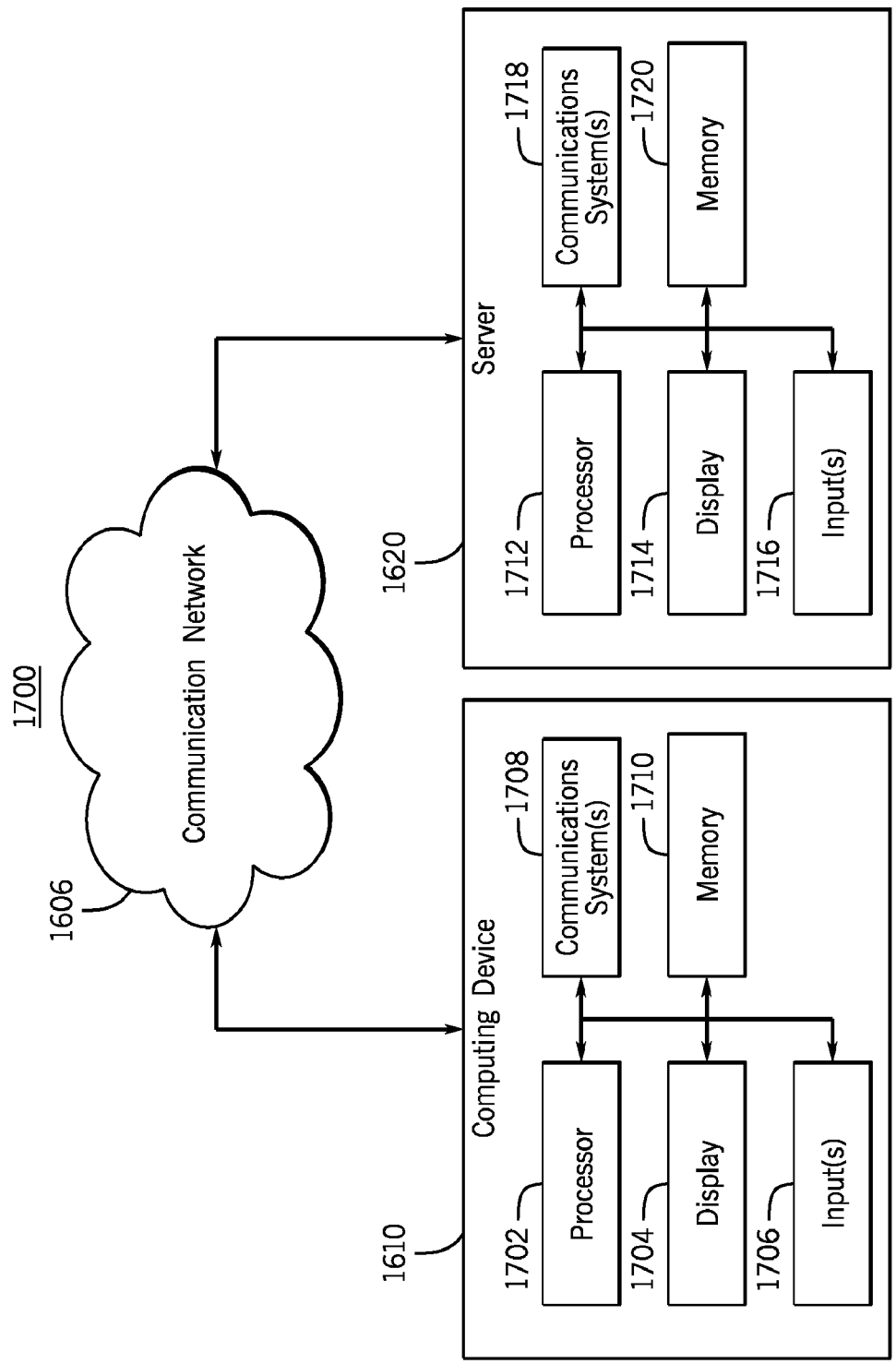
FIG. 17 shows an example of hardware that can be used to implement a computing device and server in accordance with some embodiments of the disclosed subject matter.

FIG. 17 shows an example 1700 of hardware that can be used to implement computing device 1610 and server 1620 in accordance with some embodiments of the disclosed subject matter. As shown in FIG. 17, in some embodiments, computing device 1610 can include a processor 1702, a display 1704, one or more inputs 1706, one or more communication systems 1708, and/or memory 1710. In some embodiments, processor 1702 can be any suitable hardware processor or combination of processors, such as a central processing unit, a graphics processing unit, etc. In some embodiments, display 1704 can include any suitable display devices, such as a computer monitor, a touchscreen, a television, etc. In some embodiments, inputs 1706 can include any suitable input devices and/or sensors that can be used to receive user input, such as a keyboard, a mouse, a touchscreen, a microphone, etc.

In some embodiments, communications systems 1708 can include any suitable hardware, firmware, and/or software for communicating information over communication network 1606 and/or any other suitable communication networks. For example, communications systems 1708 can include one or more transceivers, one or more communication chips and/or chip sets, etc. In a more particular example, communications systems 1708 can include hardware, firmware and/or software that can be used to establish a Wi-Fi connection, a Bluetooth connection, a cellular connection, an Ethernet connection, etc.

In some embodiments, memory 1710 can include any suitable storage device or devices that can be used to store instructions, values, etc., that can be used, for example, by processor 1702 to present content using display 1704, to communicate with server 1620 via communications system(s) 1708, etc. Memory 1710 can include any suitable volatile memory, non-volatile memory, storage, or any suitable combination thereof. For example, memory 1710 can include RAM, ROM, EEPROM, one or more flash drives, one or more hard disks, one or more solid state drives, one or more optical drives, etc. In some embodiments, memory 1710 can have encoded thereon a computer program for controlling operation of computing device 1610. In such embodiments, processor 1702 can execute at least a portion of the computer program to present content (e.g., images, user interfaces, graphics, tables, etc.), receive content from server 1620, transmit information to server 1620, etc.

In some embodiments, server 1620 can include a processor 1712, a display 1714, one or more inputs 1716, one or more communications systems 1718, and/or memory 1720. In some embodiments, processor 1712 can be any suitable hardware processor or combination of processors, such as a central processing unit, a graphics processing unit, etc. In some embodiments, display 1714 can include any suitable display devices, such as a computer monitor, a touchscreen, a television, etc. In some embodiments, inputs 1716 can include any suitable input devices and/or sensors that can be used to receive user input, such as a keyboard, a mouse, a touchscreen, a microphone, etc.

In some embodiments, communications systems 1718 can include any suitable hardware, firmware, and/or software for communicating information over communication network 1606 and/or any other suitable communication networks. For example, communications systems 1718 can include one or more transceivers, one or more communication chips and/or chip sets, etc. In a more particular example, communications systems 1718 can include hardware, firmware and/or software that can be used to establish a Wi-Fi connection, a Bluetooth connection, a cellular connection, an Ethernet connection, etc.

In some embodiments, memory 1720 can include any suitable storage device or devices that can be used to store instructions, values, etc., that can be used, for example, by processor 1712 to present content using display 1714, to communicate with one or more computing devices 1610, etc. Memory 1720 can include any suitable volatile memory, non-volatile memory, storage, or any suitable combination thereof. For example, memory 1720 can include RAM, ROM, EEPROM, one or more flash drives, one or more hard disks, one or more solid state drives, one or more optical drives, etc. In some embodiments, memory 1720 can have encoded thereon a server program for controlling operation of server 1620. In such embodiments, processor 1712 can execute at least a portion of the server program to transmit information and/or content (e.g., results of a tissue identification and/or classification, a user interface, etc.) to one or more computing devices 1610, receive information and/or content from one or more computing devices 1610, receive instructions from one or more devices (e.g., a personal computer, a laptop computer, a tablet computer, a smartphone, etc.), etc.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

Figure 18:
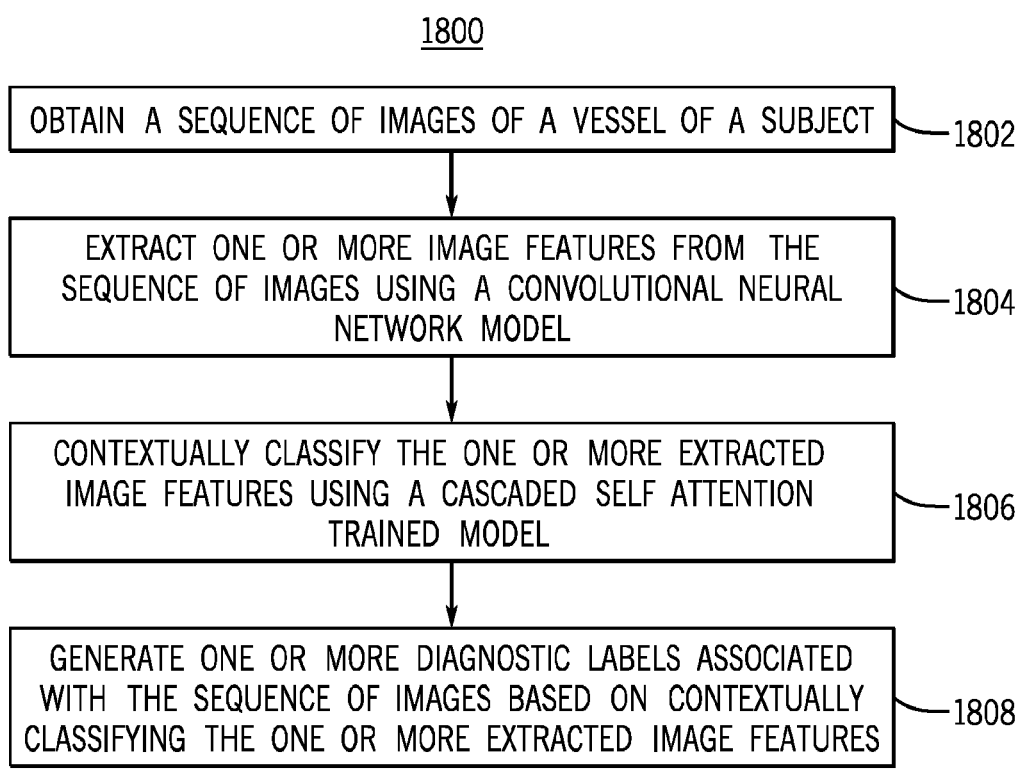
FIG. 18 shows an example of a process for identifying plaque erosion in a vessel in accordance with some embodiments of the disclosed subject matter.

FIG. 18 shows an example 1800 of a process for identifying plaque erosion in a vessel in accordance with some embodiments of the disclosed subject matter. As shown in FIG. 18, at 1802, process 1800 can obtain a sequence of images of a vessel of a subject, where the sequence of images can be obtained using a processor. At 1804, process 1800 can extract one or more image features from the sequence of images using a convolutional neural network model, where extracting can be performed using the processor. At 1806, process 1800 can contextually classify the one or more extracted image features using a cascaded self-attention trained model, where classifying can be performed using the processor. Finally, at 1808, process 1800 can generate one or more diagnostic labels associated with the sequence of images based on contextually classifying the one or more extracted image features, where generating can be performed using the processor. In addition, the one or more diagnostic labels may include an indication of a presence of plaque erosion or an absence of plaque erosion.

It should be understood that the above described steps of the process of FIG. 18 can be executed or performed in any order or sequence not limited to the order and sequence shown and described in the figures. Also, some of the above steps of the processes of FIG. 18 can be executed or performed substantially simultaneously where appropriate or in parallel to reduce latency and processing times.

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

What is claimed is:

1. A method for identifying plaque erosion in a vessel, the method comprising:
obtaining, using a processor, a sequence of images of the vessel;
extracting, using the processor, one or more image features from the sequence of images using a convolutional neural network model;
contextually classifying, using the processor, the one or more extracted image features using a cascaded self-attention trained model, wherein the cascaded self-attention trained model includes two or more transformer encoder layers; and
generating, using the processor, one or more diagnostic labels associated with the sequence of images based on contextually classifying the one or more extracted image features,
the one or more diagnostic labels comprising an indication of a presence of plaque erosion or an absence of plaque erosion.

2. The method of claim 1, wherein extracting one or more image features from the sequence of images using a convolutional neural network model further comprises:
extracting the one or more image features from the sequence of images using the convolutional neural network model operating on each image in the sequence of images individually.

3. The method of claim 1, wherein, prior to extracting the one or more image features from the sequence of images, the method comprises:
training the convolutional neural network model based on a plurality of vessel images analyzed individually to generate a first plurality of trained weights,
transferring the first plurality of trained weights to a cascaded self-attention model, and
training, based on the first plurality of trained weights, the cascaded self-attention model using a self-supervised contrastive learning procedure to generate the cascaded self-attention trained model comprising a second plurality of trained weights.

4. The method of claim 3, wherein training the cascaded self-attention model further comprises:
training, based on the first plurality of trained weights, the cascaded self-attention model based on analyzing sequences of the plurality of vessel images to generate the cascaded self-attention trained model.

5. The method of claim 4, wherein training the cascaded self-attention model further comprises:
performing, based on the second plurality of trained weights, supervised learning on the cascaded self-attention trained model to optimize generating the one or more diagnostic labels.

6. The method of claim 1, wherein extracting one or more image features from the sequence of images using a convolutional neural network model further comprises:
generating a saliency map of at least one image of the sequence of images to identify at least one of the one or more image features that is extracted by the convolutional neural network model.

7. The method of claim 6, wherein the saliency map is generated using gradient-weighted class activation mapping (Grad-CAM).

8. The method of claim 1, wherein the one or more diagnostic labels further comprise at least one of an indication of plaque rupture or an indication of an artifact from a medical device employed in acquiring the sequence of images.

9. The method of claim 1, wherein the cascaded self-attention trained model comprises a transformer model.

10. The method of claim 9, wherein the transformer model comprises a self-attention encoder layer and a cascaded feed forward network layer.

11. The method of claim 10, wherein the transformer model further comprises another transformer layer with a prepended classification token.

12. The method of claim 1, wherein the convolutional neural network model comprises a ResNet-50 model.

13. The method of claim 1, further comprising generating a probability of plaque erosion for the vessel for use in evaluating medical treatment options.

14. The method of claim 13, wherein the medical treatment options comprise delivering a therapy to the patient based on the indication.

15. The method of claim 14, wherein the therapy comprises an anti-thrombotic therapy.

16. The method of claim 15, wherein the anti-thrombotic therapy comprises a dose of ticagrelor and aspirin.

17. The method of claim 1, wherein the sequence of images comprises images from at least one of optical coherence tomography (OCT), computed tomography (CT), and/or magnetic resonance imaging (MRI).

18. The method of claim 1, wherein the sequence of images of the vessel comprises a sequence of cross-sectional images of the vessel.

19. A method for identifying plaque erosion in a vessel, the method comprising:
    training a convolutional neural network model based on a plurality of vessel images analyzed individually to generate a first plurality of trained weights;
    transferring the first plurality of trained weights to a cascaded self-attention model;
    training, based on the first plurality of trained weights, the cascaded self-attention model using a self-supervised contrastive learning procedure to generate a cascaded self-attention trained model comprising a second plurality of trained weights;
    obtaining, using a processor, a sequence of images of the vessel;
    extracting, using the processor, one or more image features from the sequence of images using a convolutional neural network model;
    contextually classifying, using the processor, the one or more extracted image features using a cascaded self-attention trained model; and
    generating, using the processor, one or more diagnostic labels associated with the sequence of images based on contextually classifying the one or more extracted image features,
        the one or more diagnostic labels comprising an indication of a presence of plaque erosion or an absence of plaque erosion.

* * * * *